(12) United States Patent
Chae et al.

(10) Patent No.: US 12,474,802 B2
(45) Date of Patent: Nov. 18, 2025

(54) VOLTAGE AND PHASE COMPENSATION CIRCUIT AND DISPLAY DEVICE INCLUDING THE SAME

(71) Applicant: LG Display Co., Ltd., Seoul (KR)

(72) Inventors: Jae Kwon Chae, Paju-si (KR); Dong Hwan Kim, Paju-si (KR); Eun Sup Yoon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/924,646

(22) Filed: Oct. 23, 2024

(65) Prior Publication Data

US 2025/0173020 A1 May 29, 2025

(30) Foreign Application Priority Data

Nov. 28, 2023 (KR) .................. 10-2023-0167649

(51) Int. Cl.
| | |
|---|---|
| *G06F 3/041* | (2006.01) |
| *G09G 3/20* | (2006.01) |
| *G06F 3/044* | (2006.01) |
| *G09G 3/32* | (2016.01) |
| *G09G 3/3225* | (2016.01) |
| *G09G 3/36* | (2006.01) |

(52) U.S. Cl.
CPC .......... *G06F 3/0418* (2013.01); *G06F 3/0412* (2013.01); *G06F 3/04164* (2019.05); *G06F 3/04166* (2019.05); *G09G 3/2096* (2013.01); *G06F 3/0446* (2019.05); *G09G 3/32* (2013.01); *G09G 3/3225* (2013.01); *G09G 3/3648* (2013.01); *G09G 2310/0297* (2013.01); *G09G 2330/06* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 10,705,635 B2 | 7/2020 | Kim et al. | |
| 11,068,099 B2 | 7/2021 | Kim et al. | |
| 2017/0075472 A1* | 3/2017 | Min | G06F 3/04166 |
| 2019/0102015 A1 | 4/2019 | Kim et al. | |
| 2020/0293139 A1 | 9/2020 | Kim et al. | |
| 2021/0191539 A1* | 6/2021 | Cheng | G06F 3/0412 |
| 2021/0294454 A1* | 9/2021 | Liu | G06F 3/0418 |

FOREIGN PATENT DOCUMENTS

| | | |
|---|---|---|
| KR | 10-2022-0071653 A | 5/2022 |
| KR | 10-2022-0144352 A | 10/2022 |
| KR | 10-2023-0018155 A | 2/2023 |

* cited by examiner

*Primary Examiner* — Krishna P Neupane
(74) *Attorney, Agent, or Firm* — Fenwick & West LLP

(57) ABSTRACT

Disclosed is a voltage and phase compensation circuit and a display device including the same. The voltage and phase compensation circuit includes a first inverting adder configured to add and invert a plurality of panel signals to output a first inverted signal; a second inverting adder configured to add and invert the feedback signals obtained from delayed panel signals and the first inverted signal to output a second inverted signal; and a coupler configured to couple the first inverted signal and the second inverted signal.

20 Claims, 18 Drawing Sheets

Symmetrical Voltage and Phase

OR Logic

NOR Logic

VOLTAGE AND PHASE COMPENSATION CIRCUIT AND DISPLAY DEVICE INCLUDING THE SAME

CROSS-REFERENCE TO RELATED APPLICATION

This application claims priority to and the benefit of Republic of Korea Patent Application No. 10-2023-0167649, filed Nov. 28, 2023, which is hereby incorporated herein in its entirety.

BACKGROUND

Technical Field

The present disclosure relates to a voltage and phase compensation circuit for a signal for reducing electromagnetic interference (hereinafter referred to as "EMI") emitted from a display panel and a display device including the same.

Discussion of Related Art

A driving circuit of the display device writes pixel data of an input image to pixels of the display panel to reproduce the input image on a pixel array. The display device includes a display panel driving circuit such as a data driving circuit that supplies a pixel data signal to data lines, and a gate driving circuit that supplies a gate signal (or a scan signal) to gate lines (or scan lines), and the like. A flat panel display device includes a control circuit, such as a timing controller, that controls the data driving circuit and the gate driving circuit.

A touch screen may be disposed on a screen of the display device. In this case, the display panel driving circuit may further include a touch sensor driving circuit for driving touch sensors of the touch screen.

The description provided in the description of the related art section should not be assumed to be prior art merely because it is mentioned in or associated with the description of the related art section. The description of the related art section may include information that describes one or more aspects of the subject technology, and the description in this section does not limit the disclosure.

SUMMARY

The inventors have recognized that an alternating current (AC) signal output from the display panel driving circuit may generate EMI and adversely affect peripheral devices. Accordingly, an object of the present disclosure has been made in an effort to address aforementioned necessities and/or drawbacks.

The present disclosure provides a voltage and phase compensation method for minimizing or at least reducing EMI and a display device using the same.

The problems of the present disclosure are not limited to the above-mentioned problems, and other problems not mentioned will be clearly understood by those skilled in the art from the following description.

According to one example embodiment of the present disclosure, a voltage and phase compensation circuit includes: a first inverting adder configured to add and invert a plurality of panel signals to output a first inverted signal; a second inverting adder configured to add and invert feedback signals obtained from delayed panel signals and the first inverted signal to output a second inverted signal; and a coupler that combines the first inverted signal with the second inverted signal.

A signal in which the first inverted signal and the second inverted signal combined may have an inverted phase of the delayed panel signals and have a voltage equal to the voltage of the delayed panel signals.

The first inverting adder may include a first operational amplifier including an inverting input terminal connected to a plurality of input resistors to which the panel signals are applied, a non-inverting input terminal to which a reference voltage is applied, and an output terminal connected to the inverting input terminal to output the first inverted signal with a resistor interposed therebetween. The second inverting adder may include a second operational amplifier including an inverting input terminal connected to a plurality of input resistors to which the feedback signals and the first inverted signal are applied, a non-inverting input terminal to which the reference voltage is applied, and an output terminal connected to the inverting input terminal to output the second inverted signal with a resistor interposed therebetween.

The plurality of input resistors of the first operational amplifier may include a first input resistor, a second input resistor, and a third input resistor to which the panel signals are applied, and the plurality of input resistors of the second operational amplifier include a first input resistor, a second input resistor, a third input resistor to which the feedback signals are applied and a fourth input resistor to which the first inverted signal is applied.

Resistance values of the plurality of input resistors of the first operational amplifier and the plurality of input resistors of the second operational amplifier may be all same.

A resistance value of the resistor interposed between the output terminal and the inverting input terminal may be smaller than the resistance value of any one of the plurality of input resistors of the first operational amplifier and the plurality of input resistors of the second operational amplifier.

The panel signals may include a first panel signal, a second panel signal, and a third panel signal having different phases. The feedback signals may include a first feedback signal obtained from delay of the first panel signal, a second feedback signal obtained from delay of the second panel signal, and a third feedback signal obtained from delay of the third panel signal. The first panel signal, the second panel signal, and the third panel signal may be input to the inverting input terminal of the first operational amplifier through input resistors of the first operational amplifier. The first feedback signal, the second feedback signal, the third feedback signal, and the first inverted signal may be input to the inverting input terminal of the second inverting adder through input resistors of the second operational amplifier.

An output voltage ratio of the first operational amplifier and the second operational amplifier may be the same.

The coupler may include a capacitor and a diode connected in series between the output terminal of the first operational amplifier and the output terminal of the second operational amplifier.

The capacitor may allow only an alternating current AC component of the second inverted signal to pass toward the diode, and the diode may block a reverse current flowing toward the second operational amplifier.

According to one example embodiment of the present disclosure, a display device includes: a display panel on which wires to which a plurality of panel signals are applied, feedback wires each connected to the wires, a plurality of pixels, and cancellation signal wires are disposed; a display panel driving circuit configured to write pixel data of an input image into the pixels; a signal generator configured to output the panel signals; and a voltage and phase compensator configured to supply an cancellation signal to the cancellation signal wires. The voltage and phase compensator includes a first inverting adder configured to add and invert the panel signals to output a first inverted signal; a second inverting adder configured to add and invert the feedback signals received from the feedback wires and the first inverted signal to output a second inverted signal; and a coupler configured to combine the first inverted signal and the second inverted signal to output the cancellation signal.

The display panel may further include a plurality of data lines to which a data voltage is applied; and a plurality of gate lines to which a gate signal is applied. The display panel driving circuit may further include a data driver configured to output the data voltage; a demultiplexer connected between the data lines and output terminals of the data driver; and a gate driver configured to output the gate. The panel signals may include at least one of a control signal configured to control transistors of the demultiplexer and a clock input to the gate driver.

The display panel further may include transmit (TX) wires connected to a plurality of touch sensors. The display panel driving circuit may further include a touch sensor driver configured to supply driving signals to the TX wires. The panel signals may include the driving signals.

According to another example embodiment of the present disclosure, a display device includes: a display panel on which TX wires connected to a plurality of touch sensors, a plurality of pixels, and cancellation signal wires are disposed; a touch sensor driver configured to sequentially supply driving signals to the TX wires; and a voltage and phase compensator configured to supply cancellation signals to the cancellation signal wires. The voltage and phase compensator includes: an inverting adder circuit configured to add and invert driving signals from the touch sensor driver; and a coupler connected between the inverting adder circuit and the cancellation signal wires.

The inverting adder circuit may include a first inverting adder configured to add and invert two or more group signals in which a plurality of the driving signals are grouped to output a first inverted signal; and a second inverting adder configured to add and invert the group signals and the first inverted signal to output a second inverted signal.

The coupler may combine the first inverted signal and the second inverted signal to output the cancellation signal.

Each of the group signals may include two or more of the driving signals grouped by logical OR. The group signals may be sequentially input to each of the first inverting adder and the second inverting adder. Each of the driving signals may include a plurality of pulses.

The first inverting adder may include a first operational amplifier including an inverting input terminal connected to a plurality of input resistors to which the group signals are applied, a non-inverting input terminal to which a reference voltage is applied, and an output terminal connected to the inverting input terminal to output the first inverted signal with a resistor interposed therebetween. The second inverting adder may include a second operational amplifier including an inverting input terminal connected to a plurality of input resistors to which the group signals and the first inverted signal are applied, a non-inverting input terminal to which the reference voltage is applied, and an output terminal connected to the inverting input terminal to output the second inverted signal with a resistor interposed therebetween.

The plurality of input resistors of the first operational amplifier may include a first input resistor, a second input resistor, a third input resistor and a fourth input resistor to which the group signals are applied and having gradually increasing resistance values, and the plurality of input resistors of the second operational amplifier may include a first input resistor, a second input resistor, a third input resistor and a fourth input resistor to which the group signals are applied and having gradually increasing resistance values.

The output voltage ratio between the first operational amplifier and the second operational amplifier may be the same.

Resistance values of at least two of the input resistors of the first operational amplifier may be different from each other. Resistance values of at least two of the input resistors of the second operational amplifier may be different from each other.

The coupler may include a capacitor and a diode connected in series between the output terminal of the first operational amplifier and the output terminal of the second operational amplifier.

The inverting adder circuit may include an inverting adder configured to add and invert a group signal in which the driving signals applied to the TX wires are grouped and an inverted signal in which the group signal is inverted; and a coupler configured to combine the output signal of the inverting adder and the inverted signal to output the cancellation signal.

The inverting adder may include an operational amplifier including an inverting input terminal connected to a plurality of input resistors to which the group signal and the inverted signal are applied, a non-inverting input terminal to which a reference voltage is applied, and an output terminal connected to the inverting input terminal with a resistor interposed therebetween.

The coupler may include a capacitor and a diode connected in series between the output terminal of the operational amplifier and a node to which the inverted signal is applied.

The capacitor may allow only an alternating current AC component of the second inverted signal to pass toward the diode, and the diode may block a reverse current flowing toward the second operational amplifier.

The present disclosure may implement a display device with high efficiency, high luminance, long lifespan, and no EMI.

The present disclosure may increase the efficiency of electromagnetic wave cancellation by compensating the voltage and phase of the inverted signal to match the panel signals, regardless of whether the panel signals, which are target signals for electromagnetic wave cancellation, overlap or not.

According to the present disclosure, EMI emitted from the display panel may be minimized or at least reduced by applying a cancellation signal obtained by combining the inverted signal of the panel signals with the inverted signal of the residual noise to one cancellation signal wire.

According to the present disclosure, TX wires of a touch screen having a multi-channel transmission structure may be grouped to individually control voltages for each TX group having a large electromagnetic emission asymmetry to increase the cancellation effect and freely control the electromagnetic emission amount.

The effects of the present disclosure are not limited to the above-mentioned effects, and other effects not mentioned will be clearly understood by those skilled in the art from the description of the claims.

BRIEF DESCRIPTION OF THE DRAWINGS

The above and other objects, features, and advantages of the present disclosure will become more apparent to those of ordinary skill in the art by describing exemplary example embodiments thereof in detail with reference to the attached drawings, in which.

Figure 1:
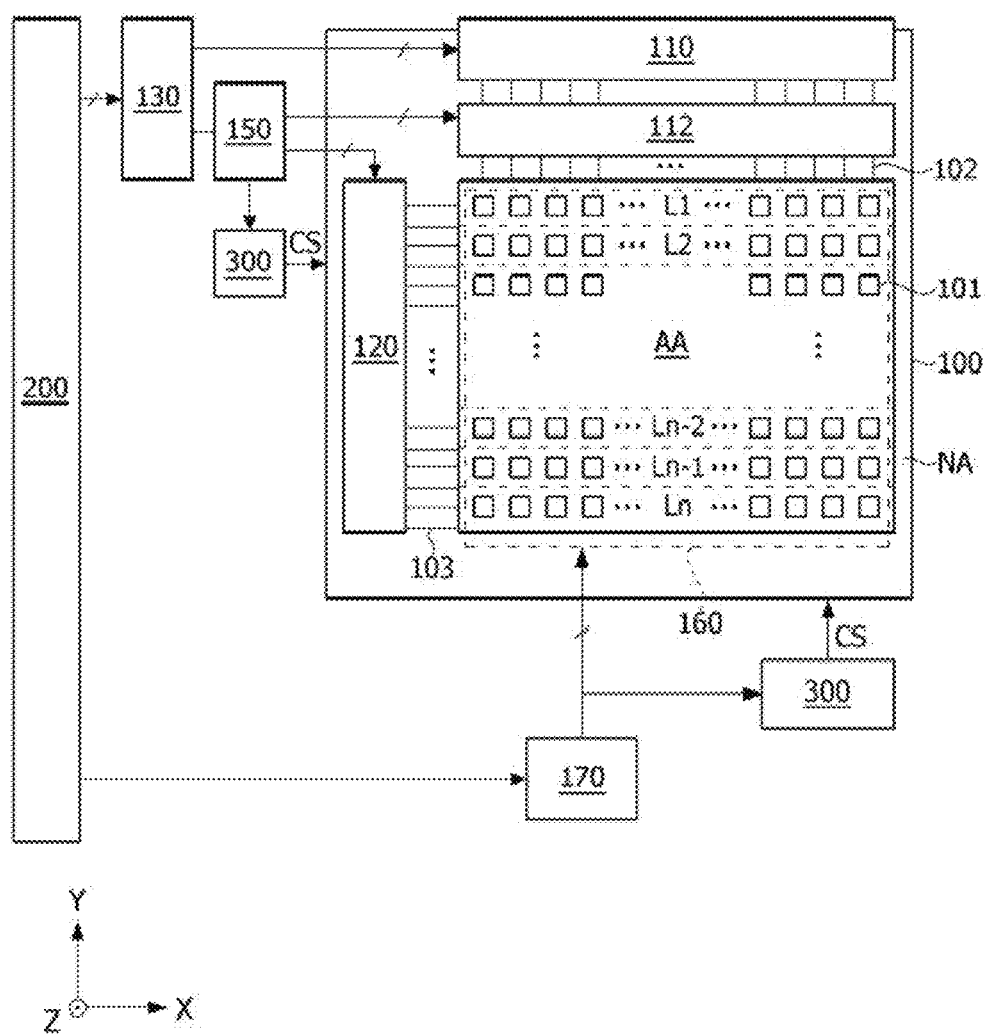
FIG. 1 is a block diagram illustrating a display device according to one example embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The advantages and features of the present disclosure and methods for accomplishing the same will be more clearly understood from example embodiments described below with reference to the accompanying drawings. However, the present disclosure is not limited to the following example embodiments but may be implemented in various different forms. Rather, the present example embodiments will make the disclosure of the present disclosure complete and allow those skilled in the art to completely comprehend the scope of the present disclosure. The present disclosure is only defined within the scope of the accompanying claims.

The shapes, sizes, areas, ratios, angles, numbers, and the like illustrated in the accompanying drawings for describing the example embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "include," "have," "comprise," "contain," "constitute," "make up of", "formed of," and "comprising" used herein are generally intended to allow other components to be added unless the terms are used with the term "only." Any references to singular may include plural unless expressly stated otherwise.

Components are interpreted to include an ordinary error range even if not expressly stated.

When a positional or interconnected relationship is described between two components, such as "on", "above", "over", "below", "under", "beside", "beneath", "near", "close to," "adjacent to", "on a side of", "next" "connect or couple with," "crossing," "intersecting," or the like, one or more other components may be interposed between them, unless "immediately" or "directly" is used.

Spatially relative terms, such as "under," "below," "beneath", "lower," "over," "upper" and the like, may be used herein for ease of description to describe one element or feature's relationship to another element(s) or feature(s) as illustrated in the figures. It will be understood that the spatially relative terms can encompass different orientations of an element in use or operation in addition to the orientation depicted in the figures. For example, if an element in the figures is inverted, elements described as "below" or "beneath" other elements or features would then be oriented "over" the other elements or features. Thus, the exemplary term "below" can encompass both an orientation of below and above. Similarly, the exemplary term "above" or "over" can encompass both an orientation of "above" and "below".

When a temporal antecedent relationship is described, such as "after", "following", "next to", "before", or the like, it may not be continuous on a time base unless "immediately" or "directly" is used.

The terms "first", "second", "A", "B", "(a)", "(b)" and the like may be used to distinguish elements from each other, but the functions or structures of the components are not limited by ordinal numbers or component names in front of the components.

In addition, terms, such as first, second, A, B, (a), (b), or the like may be used herein when describing components of the present disclosure. Each of these terminologies is not used to define an essence, order, or sequence of a corresponding component but used merely to distinguish the corresponding component from other components. In the case that it is described that a certain structural element or layer is "connected", "coupled", "adhered" or "joined" to another structural element or layer, it is typically interpreted that another structural element or layer may be "connected", "coupled", "adhered" or "joined" to the structural element or layer directly or indirectly.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

A term "device" used herein may refer to a display device including a display panel and a driver for driving the display panel. Examples of the display device may include a light emitting device, and the like. In addition, examples of the device may include a notebook computer, a television, a computer monitor, an automotive device, a wearable device, and an automotive equipment device, and a set electronic device (or apparatus) or a set device (or apparatus), for example, a mobile electronic device such as a smartphone or an electronic pad, which are complete products or final products respectively including the light emitting device and the like, but embodiments of the present disclosure are not limited thereto.

Like reference numerals generally denote like elements throughout the specification.

A size and a thickness of each component illustrated in the drawing are illustrated for convenience of description, and the present disclosure is not limited to the size and the thickness of the component illustrated.

The following example embodiments can be partially or entirely bonded to or combined with each other and can be linked and operated in technically various ways. The example embodiments can be carried out independently of or in association with each other.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein.

Hereinafter, various example embodiments of the present disclosure will be described in detail with reference to the accompanying drawings.

Figure 2:
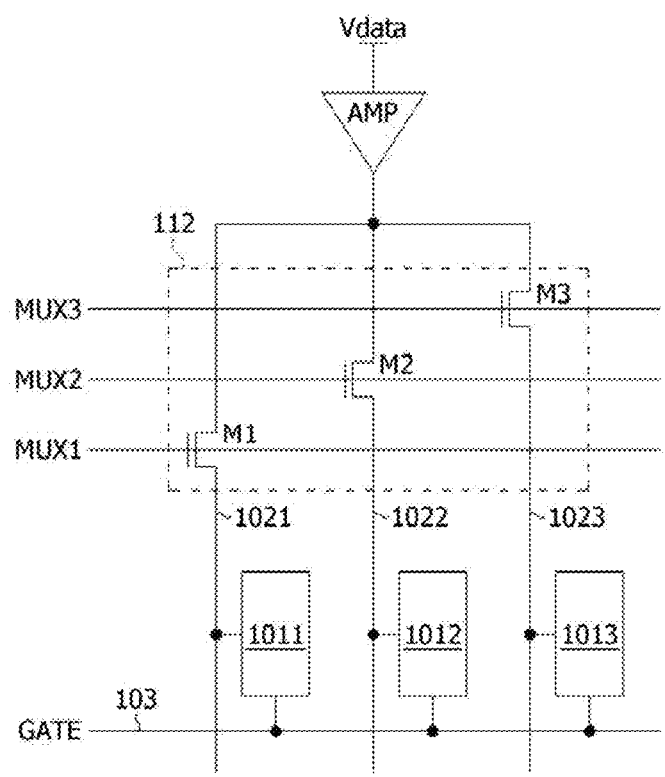
FIG. 2 is a circuit diagram illustrating an example of a demultiplexer according to example embodiments of the present disclosure.

Referring to FIGS. 1 and 2, a display device according to an example embodiment of the present disclosure includes a display panel 100, a display panel driving circuit for writing video data to pixels of the display panel 100, and a power supply 140 for generating power necessary for driving the pixels 101 and the display panel driving circuit, but components of the display device of the present disclosure are not limited thereto. Meanwhile, all the components of each display device according to all embodiments of the present disclosure are operatively coupled and configured.

The substrate of the display panel 100 may be a plastic substrate, a thin glass substrate, or a metal substrate, but is not limited thereto. In some example embodiments, the substrate may be formed of a plastic material having flexibility. In some example embodiments, the substrate may be made of a flexible polymer film. For example, the flexible polymer film may be made of any one of polyimide (PI), polyethylene terephthalate (PET), acrylonitrile-butadiene-styrene copolymer(ABS), polymethyl methacrylate (PMMA), polyethylene naphthalate (PEN), polycarbonate (PC), polyethersulfone (PES), polyarylate (PAR), polysulfone (PSF), cyclic olefin copolymer (COC), triacetylcellulose (TAC), polyvinyl alcohol (PVA), and polystyrene (PS), and the present disclosure is not limited thereto. The display panel 100 may be a panel having a rectangular structure having a length in an X-axis direction (or a first direction), a width in a Y-axis direction (or a second direction), and a thickness in a Z-axis direction (or a third direction), but is not limited thereto. For example, at least a portion of the display panel 100 may have a curved outer portion. For example, the at least a portion having the curved outer portion may be disposed in the center of the display panel 100, alternatively, the at least a portion having the curved outer portion may be disposed at least one side of the display panel 100, but is not limited thereto.

The display panel 100 may be implemented as a non-transmissive display panel or a transmissive display panel. The transmissive display panel may be applied to a transparent display device in which an image is displayed on a screen and an actual object is visible beyond the display panel 100. The display panel 100 may be manufactured as a flexible display panel. The display panel 100 may be manufactured as a stretchable panel that is extendable, but is not limited thereto.

In the display panel 100, a display area AA and a non-a display area NA disposed in the vicinity of the display area AA, surrounding the display area AA, or around the display AA may be defined. The display area AA of the display panel 100 includes a pixel array that displays an input image. The pixel array includes a plurality of data lines 102, a plurality of gate lines 103 intersecting with the data lines 102, and pixels 101 arranged in a matrix. For example, in the display area AA, a plurality of pixel regions may be arranged in a matrix form along a plurality of row and column lines. The plurality of pixel regions may include pixel regions displaying different colors, for example, red (R), green (G), and blue (B), or red (R), green (G), blue (B), and white (W). At this time, the red (R), green (G), and blue (B) pixel regions that are adjacent to each other or the red (R), green (G), blue (B), and white (W) pixel regions that are adjacent to each other may function as a unit pixel for displaying a color image. The display panel 100 may further include power supply lines commonly connected to the pixels 101. The power supply lines are commonly connected to the pixel circuits so as to supply a constant voltage required for driving the pixels 101 to the pixels. The power supply lines may be implemented as long stripe wires along a first direction or a second direction, or may be implemented as mesh wires in which the wires in the first direction and the wires in the second direction are electrically connected.

The pixels 101 may include a liquid crystal cell including a liquid crystal molecule or a light emitting element. The plurality of sub pixels is a minimum unit which configures the display area AA and n sub pixels form one pixel. Each of the plurality of sub pixels may emit light having different wavelengths from each other. The plurality of sub pixels may include first to third sub pixels which emit different color light from each other or the plurality of sub pixels may include first to fourth sub pixels which emit different color light from each other. For example, each of the pixels 101 may be divided into a red sub-pixel, a green sub-pixel, and a blue sub-pixel for color implementation. Each of the pixels may further include a white sub-pixel.

For example, the plurality of sub pixels may include red, green, and blue sub-pixels, in which the red, green, and blue sub-pixels may be disposed in a repeated manner. Alternatively, the plurality of sub pixels may include red, green, blue, and white sub-pixels, in which the red, green, blue, and white sub-pixels may be disposed in a repeated manner, or the red, green, blue, and white sub-pixels may be disposed in a quad type. For example, the red sub pixel, the blue sub pixel, and the green sub pixel may be sequentially disposed along a row direction, or the red sub pixel, the blue sub pixel, the green sub pixel and the white sub pixel may be sequentially disposed along the row direction. However, in the example embodiment of the present disclosure, the color type, disposition type, and disposition order of the sub-pixels are not limiting, and may be configured in various forms according to light-emitting characteristics, device lifespans, and device specifications.

Meanwhile, the sub-pixels may have different light-emitting areas according to light-emitting characteristics. For example, a sub-pixel that emits light of a color different from that of a blue sub-pixel may have a different light-emitting area from that of the blue sub-pixel. For example, the red sub-pixel, the blue sub-pixel, and the green sub-pixel, or the red sub-pixel, the blue sub-pixel, the white sub-pixel, and the green sub-pixel may each has a different light-emitting area.

Each of the sub-pixels includes a pixel circuit for driving the light emitting element. Each of the pixel circuits may be connected to data lines, gate lines, and power supply lines. Hereinafter, a 'pixel' may be interpreted as a 'sub-pixel'.

The pixel array includes a plurality of pixel lines L1 to Ln. Each of the pixel lines L1 to Ln includes one line of pixels disposed along the line direction (X-axis direction) in the pixel array of the display panel 100. Pixels disposed in one pixel line share the gate lines 103. Sub-pixels disposed in the column direction Y along the data line direction share the same data lines 102. One horizontal period is a time obtained by dividing one frame period by the total number of pixel lines L1 to Ln.

The power supply 140 generates a constant voltage (or a DC voltage) required for driving a pixel array of the display panel 100 and a display panel driving circuit by using a DC-DC converter. The DC-DC converter may include a charge pump, a regulator, a buck converter, a boost converter, and the like. The power supply 140 may output a constant voltage required for driving the display panel driving circuit and the pixel by adjusting a level of a DC input voltage applied from a host system 200.

The display panel driving circuit writes video data of the input image to the pixels of the display panel 100 under the control of a timing controller 130. The display panel driving circuit includes a data driver 110 and a gate driver 120.

The display panel driving circuit further includes a touch sensor driver 170 for driving touch sensors of a touch screen 160. The touch sensors may be disposed on the display panel 100 in an on-cell type or an add-on type, or may be implemented as in-cell type touch sensors embedded in the display panel 100. The touch sensors may be the touch sensors using capacitance, for example, self-capacitance type touch sensors or mutual-capacitance type touch sensors, but are not limited thereto.

The data driver 110 and the touch sensor driver 170 may be integrated in a single drive integrated circuit (IC). In a mobile terminal or a wearable terminal, the timing controller 130, the power supply 140, a level shifter 150, the data driver 110, the touch sensor driver 170, and the like may be integrated in the single drive IC, but are not limited thereto.

The output terminals of the data driver 110 may be electrically connected to the data lines 102 of the display panel 100. The data driver 110 receives video data of an input image received as a digital signal from the timing controller 130 and outputs a data voltage. The data driver 110 converts the video data of the input image into a gamma compensation voltage using a digital to analog converter (hereinafter, referred to as "DAC") to output the data voltage. The gamma reference voltage may be output from the power supply 140. The gamma reference voltage is subdivided into the gamma compensation voltage for each gray level through a voltage dividing circuit of the data driver 110 and is provided to the DAC. The DAC generates the data voltage as the gamma compensation voltage corresponding to the gray level of the video data. The data voltage output from the DAC is output to the data line 102 through an output buffer from each of data output channels of the data driver 110. The data driver 110 may be configured with at least one data IC. In this case, as an example, the data IC of the data driver 110 may be connected to non-display area on a corresponding one side of the display panel 100, or may be mounted directly on the non-display area. As an example, the data IC of the data driver 110 may be mounted on a flexible circuit film and connected to the non-display area on a corresponding one side of the display panel 100.

The display panel driving circuit may further include a plurality of demultiplexers (DEMUX) 112 disposed between the data lines 102 and the output terminals of the data driver 110. The demultiplexer 112 may be a 1:N demultiplexer, where N is a natural number greater than or equal to 2. In the case of the 1:3 demultiplexer 112, the data voltage Vdata output from the data driver 110 is sequentially supplied to first to third data lines 1021, 1022, and 1023 using first to third transistors M1, M2, and M3 as shown in FIG. 2. In FIG. 2, GATE is a gate signal output from the gate driver 120. Sub-pixels 1011, 1012, and 1013 are connected to corresponding data lines 1021, 1022, and 1023 and the gate line 103. In FIG. 2, reference numerals MUX1, MUX2, and MUX3 are control signals applied to gates of the transistors M1, M2, and M3.

When the demultiplexer 112 is connected between the output terminals of the data driver 110 and the data lines 102, the number of channels of the data driver 110 may be reduced. The demultiplexer 112 may also be omitted.

The gate driver 120 may be formed on the display panel 100. The gate driver 120 may be disposed in a non-display area NA outside the display area AA in the display panel 100, or at least a portion thereof may be disposed in the display area AA. Even though in FIG. 1, it is illustrated that one gate driver 120 is disposed at one side of the display panel 100, the number of the gate drivers 120 and the placement thereof are not limited thereto. For example, two gate drivers 120 may be disposed at two sides of the display panel 100, respectively. For example, the gate drivers 120 may be mounted on the display panel 100. As such, the structure in which the gate drivers 120 is directly mounted on the display panel 100 is referred to as a gate in panel (GIP) structure, without being limited thereto. Alternatively, the gate drivers 120 may be spaced apart from the display panel 100, but not limited thereto.

The gate driver 120 may supply the gate signal to the gate lines 103 in a single feeding manner, but is not limited thereto, for example, the gate driver 120 may also supply the gate signal to the gate lines 103 in a double feeding manner. In single feeding, the gate signal is applied to one end of the gate line 103. In double feeding manner, the gate signal is simultaneously applied to both ends of the gate line 103.

The gate driver 120 sequentially outputs the pulses of the gate signal to the gate lines 103 using a shift register and/or an edge trigger.

The touch sensor driver 170 is connected to the touch wires. A plurality of touch sensors are connected to the touch wires. The touch wires may be divided into TX wires, to which a driving signal (hereinafter, referred to as a "signal") for driving the touch sensor is applied, and receive (RX) wires, to which an output signal of the touch sensor is transmitted, but are not limited thereto. The touch sensor driver 170 may convert a voltage of a TX signal through a level shifter and supply the voltage to the TX wires.

The touch sensor driver 170 applies the TX signal to the touch sensors through the TX wires, amplifies the voltage from the touch sensors received from the RX wires, converts the amplified voltage into digital data, and outputs touch raw data. The touch sensor driver 170 compares the input touch raw data with a preset reference value and outputs touch data TDATA indicating each of the touch inputs. The touch raw data TDATA equal to or greater than the reference value may be output as a logical value indicating the touch input. The touch data TDATA may be transmitted to the host system 200.

The timing controller 130 receives video data of the input image and a timing signal synchronized with the data from the host system 200. The timing signal may include a vertical synchronization signal Vsync, a horizontal synchronization signal Hsync, a data enable signal DE, and the like. Here, the horizontal synchronization signal is a signal representing a time taken to display one horizontal line of a screen and the vertical synchronization signal is a signal representing a time taken to display a screen of one frame. The data enable signal may correspond to a signal indicating a period for which a data voltage is supplied to the pixel. Since the vertical period and the horizontal period may be known by the method of counting the data enable signal DE, the vertical synchronization signal Vsync and the horizontal synchronization signal Hsync may be omitted. The data enable signal DE has a period of one horizontal period 1H.

The timing controller 130 controls the display panel driving circuit by generating a signal for controlling the operation timing of the display panel driving circuit based on the timing signals Vsync, Hsync, and DE received from the host system 200.

The host system 200 may scale an image signal from a video source to match the resolution of the display panel 100 and transmit the same to the timing controller 130 along with the timing signal. The host system 200 processes a user command received through a touch input in response to the touch data TDATA input from the touch sensor driver 170.

When a still image or always on display (AOD) data is input under the control of the timing controller 130 or the host system 200, the display panel driving circuit may enter a low power mode to reduce power consumption of the display device. In a normal mode, the scan rate of the display panel 100 decreases, and thus the refresh rate of the pixels 101 may be reduced to 60 Hz, 144 Hz, 240 Hz, etc. The refresh rate is a frequency at which video data is written to the pixels 101. In the low power mode, the refresh rate of the pixels 101 decreases to a frequency lower than 60 Hz, for example, the refresh rate of the pixels 101 decreases to a frequency lower than 50 Hz, for example, 1 Hz to 30 Hz. When the refresh rate is 1 Hz, a first frame among 60 frames per second may be a refresh frame, and 59 frames thereafter may be holding frames. In the refresh frame period, after the data voltage Vdata of the video data is charged in the pixels 101, the pixels 101 may maintain the data voltage charged in the previous refresh frame without charging the data voltage Vdata during the continuous holding frame period to maintain the light emitting state.

The display panel driving circuit includes a voltage and phase compensator 300 that outputs a cancellation signal CS, whose voltage and phase are inverted, with respect to the alternating current signal (hereinafter referred to as a "panel signal") applied to the display panel driving circuit. The cancellation signal CS is applied to cancellation signal wires disposed on the display panel 100.

The voltage and phase compensator 300 may be disposed on a printed circuit board (PCB) on which the timing controller 130, the level shifter 150, the touch sensor driver 170, and the like are mounted, but are not limited thereto. The voltage and phase compensator 300 may include at least one of a first voltage and phase compensator connected to the output terminal of the level shifter 150, and a second voltage and phase compensator connected to the output terminal of the touch sensor driver 170.

Figure 3:
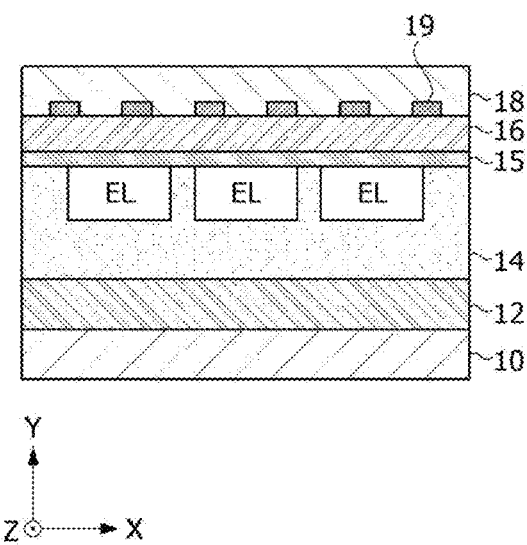
FIG. 3 is a cross-sectional view illustrating an example of a display panel according to example embodiments of the present disclosure.

In the case of an electroluminescent display device, the display panel may have a cross-sectional structure as shown in FIG. 3, but is not limited thereto.

Referring to FIG. 3, the display panel 100 may include a circuit layer 12, a light emitting device layer 14, an encapsulation layer 16, and a touch sensor layer 18 stacked on a substrate 10.

The circuit layer 12 may include a pixel circuit, a demultiplexer 112, a gate driver 120, and the like connected to wires such as data lines, gate lines, and power lines. Wires and circuit elements of the circuit layer 12 may include a plurality of insulating layers, two or more metal layers separated from each other with an insulating layer interposed therebetween, and an active layer including a semiconductor material.

The light emitting device layer 14 may include a light emitting device EL driven by a pixel circuit. The light emitting device EL may be implemented as an organic light emitting device such as an OLED or an inorganic light emitting device such as a micro LED. The light emitting device EL may include a red light emitting device, a green light emitting device, and a blue light emitting device. In another example embodiment, the light emitting device layer 14 may include a white light emitting device and a color filter. The light emitting devices EL of the light emitting device layer 14 may be covered by multiple protective layers including an organic film and an inorganic film.

The encapsulation layer 16 covers the light emitting device layer 14 to seal the circuit layer 12 and the light emitting device layer 14. The encapsulation layer 16 may have a multi-insulating film structure in which the organic film and the inorganic film are alternately stacked. The inorganic film blocks or at least reduces moisture or oxygen from penetrating. The organic film planarizes the surface of the inorganic film. When the organic film and the inorganic film are stacked in several layers, a movement path of moisture or oxygen is longer than that of a single layer, so that penetration of moisture and oxygen affecting the light emitting device layer 14 may be effectively blocked.

The encapsulation layer 16 may include a first encapsulation layer, a second encapsulation layer, and a third encapsulation layer. The first encapsulation layer to the third encapsulation layer may be sequentially stacked on the light emitting device layer 14, the first encapsulation layer and the third encapsulation layer may be formed of an inorganic film layer including an inorganic material, and the second encapsulation layer may be formed of an organic film layer including an organic material.

The first encapsulation layer may be formed at the lowermost end of the encapsulation layer 16, for example, may be in contact with the upper surface of the light emitting device layer 14. The first encapsulation layer may be formed of a material such as silicon nitride SiNx, silicon oxide SiOx, silicon oxynitride SiON, or aluminum oxide Al2O3.

The second encapsulation layer may be formed on the first encapsulation layer. The second encapsulation layer may be formed of a material such as acrylic resin, epoxy resin, polyimide, polyethylene PE, or silicon oxycarbon SiOC.

The third encapsulation layer may be formed on the second encapsulation layer. The third encapsulation layer may be formed of the same material as the first encapsulation layer, but not limited thereto, the third encapsulation layer may be formed of different material from the first encapsulation layer.

Meanwhile, the encapsulation layers are not limited to three layers, for example, n layers alternately stacked between inorganic encapsulation layer and organic encapsulation layer (where n is an integer greater than 3) may be included.

The touch sensor layer 18 may be disposed on the encapsulation layer 16. The touch sensor layer 18 includes touch sensors and touch wires 19 connected to the touch sensors. The touch wires 19 and the touch sensor electrodes may be formed of metal patterns disposed on the encapsulation layer 16. At the intersection of the metal wire patterns, for example, at a portion where the TX wires and the RX wires intersect, the metal wire patterns may be disposed with an insulating layer therebetween to insulate them from each other.

A polarizer or a color filter layer may be disposed on the touch sensor layer 18. The polarizer may improve visibility and contrast ratio by converting polarization of external light reflected by the metal of the touch sensor layer 18 and the circuit layer 12. The color filter layer may include red, green, and blue color filters. The color filter layer may further include a black matrix pattern. The black matrix pattern may serve to prevent or at least reduce light leakage of the color filter layer. Alternatively, the black matrix pattern may serve to increase an absorption rate of external light incident from the outside of the display device. Since only a very small amount of incident external light may be reflected by the black matrix pattern, it is possible to increase visibility and clarity due to less influence of external light. In addition, the black matrix pattern is used to decrease contrast caused by bottom reflection of external light and may absorb light having the wavelength in a visible light range. The color filter layer may absorb a part of the wavelength of light reflected from the metal of the circuit layer 12 and the touch sensor layer 18 to replace the role of a polarizer and increase the color purity of an image reproduced in the pixel array.

Figure 4:
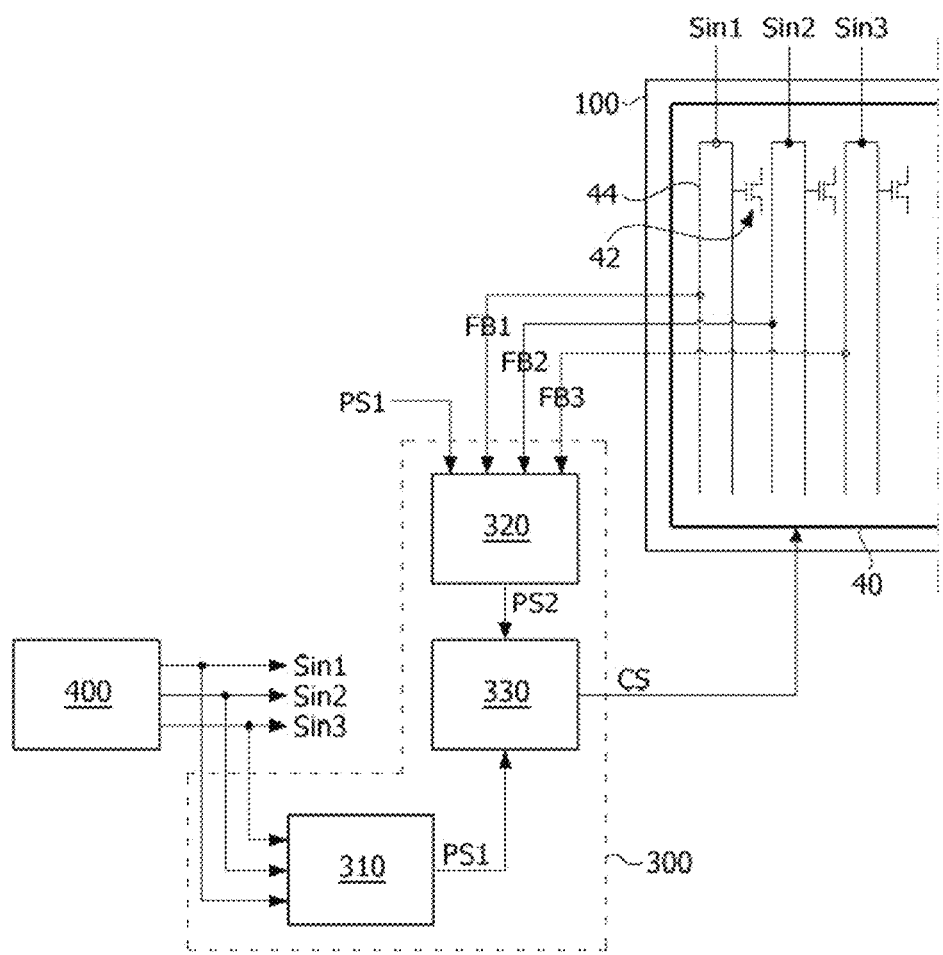
FIG. 4 is a diagram illustrating an example of a voltage and phase compensation circuit according to one example embodiment of the present disclosure.

FIG. 4 is a diagram illustrating an example of a voltage and phase compensation circuit according to one example embodiment of the present disclosure. In the example embodiment, the voltage and phase compensation circuit receives a panel signal before being applied to the display panel and a feedback signal received from the display panel to output a cancellation signal. The cancellation signal is applied to a cancellation signal wire disposed on the display panel.

Referring to FIG. 4, the display panel 100 includes feedback signal wires 44 connected to signal wires to which panel signals Sin1, Sin2, and Sin3 are applied, and a cancellation signal wire 40 to which a cancellation signal CS is applied.

Figure 5A:
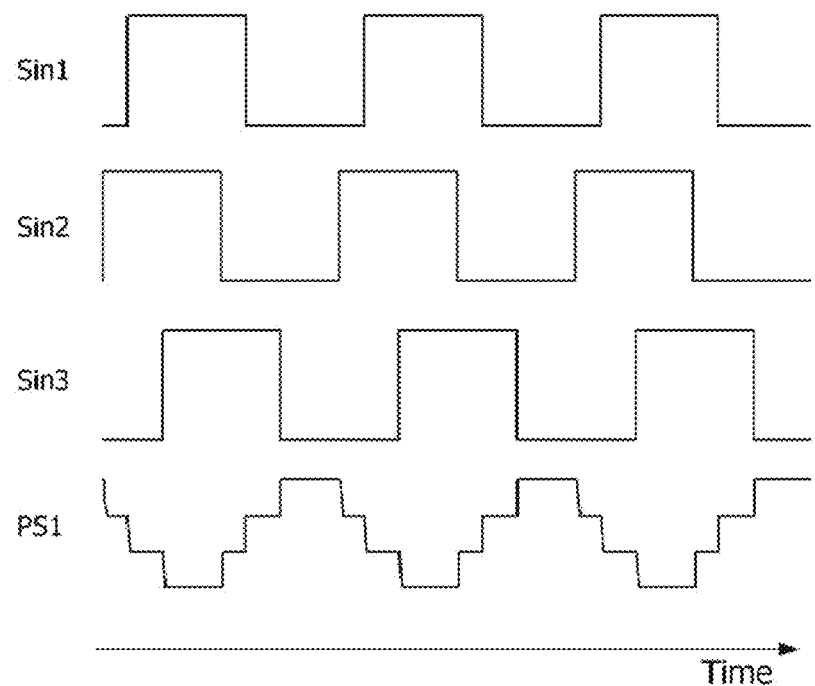
FIGS. 5A and 5B are diagrams illustrating examples of panel signals and a first inverted signal according to example embodiments of the present disclosure.
Figure 5B:
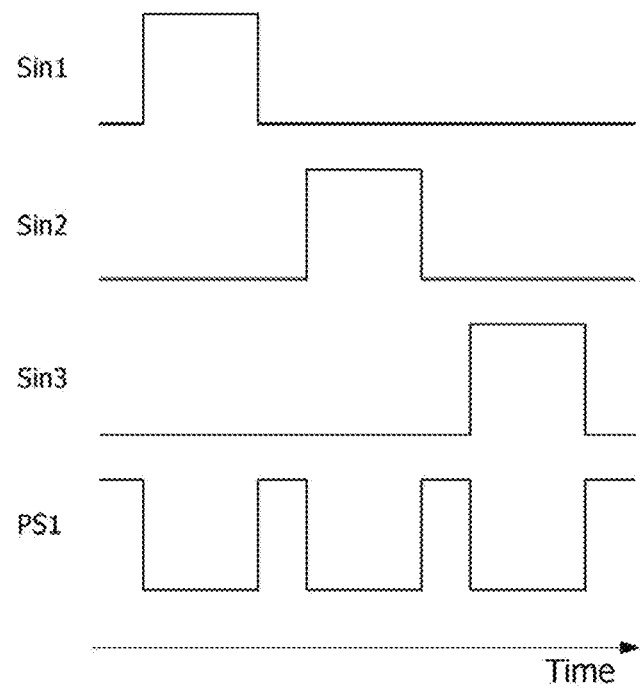

The panel signals Sin1, Sin2, and Sin3 are signals applied to the display panel 100 to induce electromagnetic emission from the display panel 100. The panel signals Sin1, Sin2, and Sin3 may be a plurality of panel signals having different phases, and may overlap or may not overlap each other. For example, as shown in FIG. 5A, any two of the panel signals Sin1, Sin2, and Sin3 overlap with each other. Alternatively, for example, as shown in FIG. 5B, any two of the panel signals Sin1, Sin2, and Sin3 do not overlap with each other, but are not limited thereto. The panel signals Sin1, Sin2, and Sin3 may be a control signal applied to the transistor 42 of the demultiplexer 112, a clock applied to the transistor 42 of the gate driver 120, a TX signal applied to the touch sensors, and the like, but are not limited thereto. The signal wires to which the panel signals Sin1, Sin2, and Sin3 are applied may be metal wires connected to a transistor of the display panel 100.

The panel signals Sin1, Sin2, and Sin3 may include two or more of a control signal of the demultiplexer 112, a clock input to the gate driver 120, and a TX signal applied to the touch sensors. For example, the panel signals Sin1, Sin2, and Sin3 may include all of the control signal of the demultiplexer 112, the clock input to the gate driver 120, and the TX signal applied to the touch sensors, but not limited thereto.

The cancellation signal CS is a signal whose phase is inverted (or 180 degrees shifted) with respect to the panel signals Sin1, Sin2, and Sin3 and has the same voltage as the voltage of the panel signals Sin1, Sin2, and Sin3. The cancellation signal is applied to the cancellation signal wire 40 disposed on the display panel to cancel electromagnetic waves from the panel signals Sin1, Sin2, and Sin3. The cancellation signal wire 40 is a metal wire that emits electromagnetic waves having an inverted phase that compensate electromagnetic waves generated due to the panel signals Sin1, Sin2, and Sin3 by being applied with the cancellation signal CS. The cancellation signal wire 40 may be a single loop pattern disposed in the non-display area NA of the display panel 100, but is not limited thereto.

When the cancellation signal CS has an inverted phase of the panel signals Sin1, Sin2, and Sin3 delayed in the display panel 100 and has an amplitude equal to the amplitude of the delayed panel signals Sin1, Sin2, and Sin3, the waveforms of the delayed panel signals Sin1, Sin2, and Sin3 are symmetrical to the waveforms of the cancellation signals CS. The amplitude may be a voltage. In this case, electromagnetic waves due to the panel signals Sin1, Sin2, and Sin3 may be minimized or at least reduced only by the single cancellation signal wire 40. The cancellation signal wire 40 may include a plurality of wires.

The voltage and phase compensator 300 includes a first inverting adder 310, a second inverting adder 320, and a coupler 330.

The first inverting adder 310 adds and inverts two or more panel signals Sin1, Sin2, and Sin3 input from a signal generator 400 to output a first inverted signal PS1. The signal generator 400 may be at least one of the timing controller 130, the level shifter 150, and the touch sensor driver 170.

The second inverting adder 320 receives feedback signals FB1, FB2, and FB3 from the feedback signal wires 44 transferring the panel signals Sin1, Sin2, and Sin3 on the display panel 100, and receives the first inverted signal PS1 from the first inverting adder 310. The panel signals Sin1, Sin2, and Sin3 are RC delayed due to resistance R and capacitance C existing on a transmission path including signal wires of the display panel 100 from the signal generator 400. The feedback signals FB1, FB2, and FB3 are panel signals to which propagation delays of the panel signals Sin1, Sin2, and Sin3 are reflected.

The second inverting adder 320 adds and inverts the feedback signals FB1, FB2, and FB3 and the first inverted signal PS1 to output the second inverted signal PS2. When the feedback signals FB1, FB2, and FB3 and the first inverted signal PS1 are added, most of them may be canceled, but due to the phase difference and the voltage difference of the feedback signals FB1, FB2, and FB3 and the first inverted signal PS1, residual noise which is not cancellation may remain. The second inverted signal output from the second inverting adder 320 is an inverted signal of the residual noise.

The coupler 330 may combine the first inverted signal PS1 and the second inverted signal PS2 to output a cancellation signal CS. When the first inverted signal PS1 and the second inverted signal PS2 are coupled to each other, the coupler 330 may block a DC component of the second inverted signal PS2 and block a current flowing toward the second inverted adder 320.

FIGS. 5A and 5B are diagrams illustrating examples of panel signals and a first inverted signal.

The panel signals Sin1, Sin2, and Sin3 include pulses. The pulses of the panel signals Sin1, Sin2, and Sin3 may have intervals in which they overlap each other as illustrated in FIG. 5A or may not overlap each other as illustrated in FIG. 5B. The first inverted signal PS1 is a signal obtained by adding and inverting the panel signals Sin1, Sin2, and Sin3. The voltage and phase compensator 300 combines the second inverted signal PS2 obtained by adding and inverting the feedback signals FB1, FB2, and FB3 in which the delay of the panel signals Sin1, Sin2, and Sin3 is reflected and the first inverted signal PS1 with the first inverted signal PS1 to generate a cancellation signal CS. For example, the second inverted signal PS2 is obtained by adding and inverting the feedback signals FB1, FB2, and FB3 and the first inverted signal PS1 via the second inverted adder 320, and the cancellation signal CS is generated by combining the second inverted signal PS2 with the first inverted signal PS1 via the coupler 330, but the present disclosure is not limited thereto.

The voltage and phase compensator 300 may match the voltage and phase of the panel signals Sin1, Sin2, and Sin3 applied to the display panel 100 and the cancellation signal CS regardless of whether the panel signals Sin1, Sin2, and Sin3 overlap, thereby minimizing or at least reducing electromagnetic waves generated by the panel signals Sin1, Sin2, and Sin3. The cancellation efficiency approaches 100% when the phases of the panel signals Sin1, Sin2, Sin3 applied to the display panel 100 and the cancellation signal CS are inverted close to 180 degrees from each other, and the harmonics voltages of the panel signals Sin1, Sin2, Sin3 and the cancellation signal CS are equal to each other.

Figure 6:
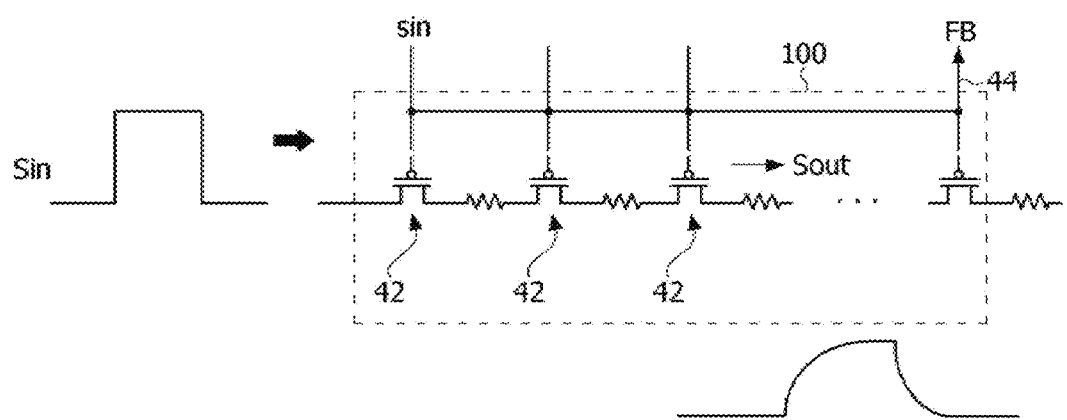
FIG. 6 is a waveform diagram illustrating an example in which a panel signal is delayed in a display panel according to example embodiments of the present disclosure.
Figure 7:
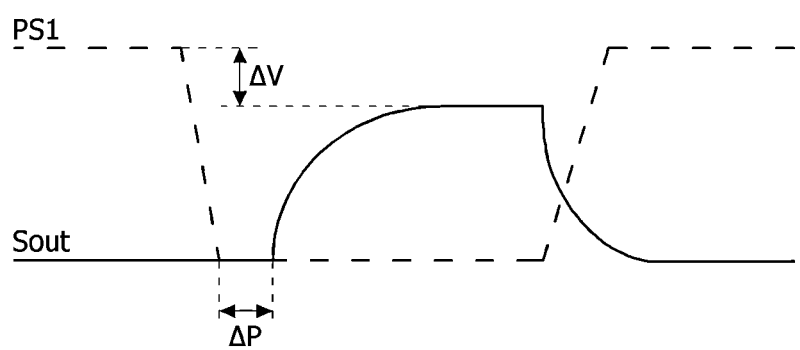
FIG. 7 is a waveform diagram illustrating an example in which phases and voltages of the first inverted signal and the panel signal are asymmetric when the first inverted signal is applied to the display panel according to example embodiments of the present disclosure.
Figure 8:
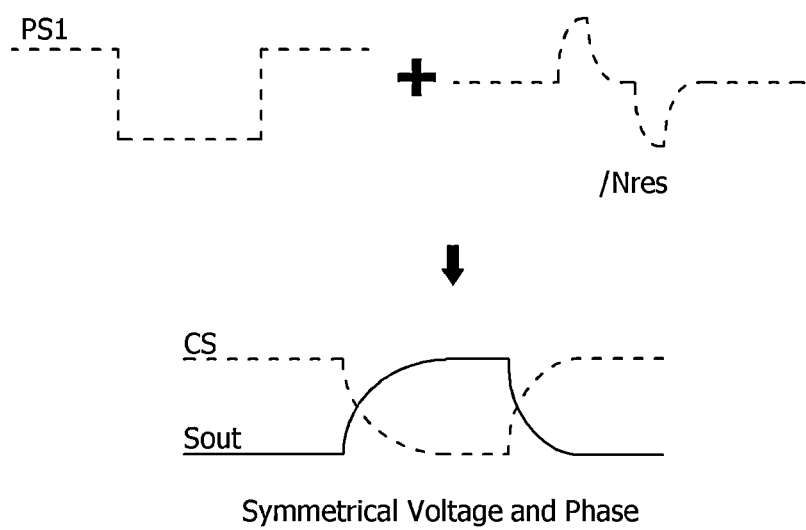
FIG. 8 is a waveform diagram illustrating an example in which phases and voltages of the panel signal and a cancellation signal are symmetrical according to example embodiments of the present disclosure.
Figure 9:
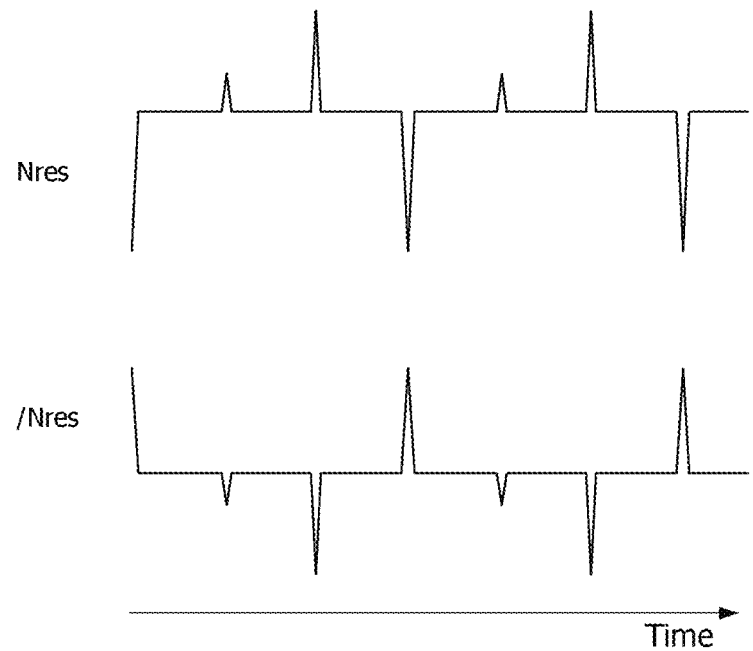
FIG. 9 is a waveform diagram illustrating an example of residual noise and inverted residual noise according to example embodiments of the present disclosure.
Figure 10:
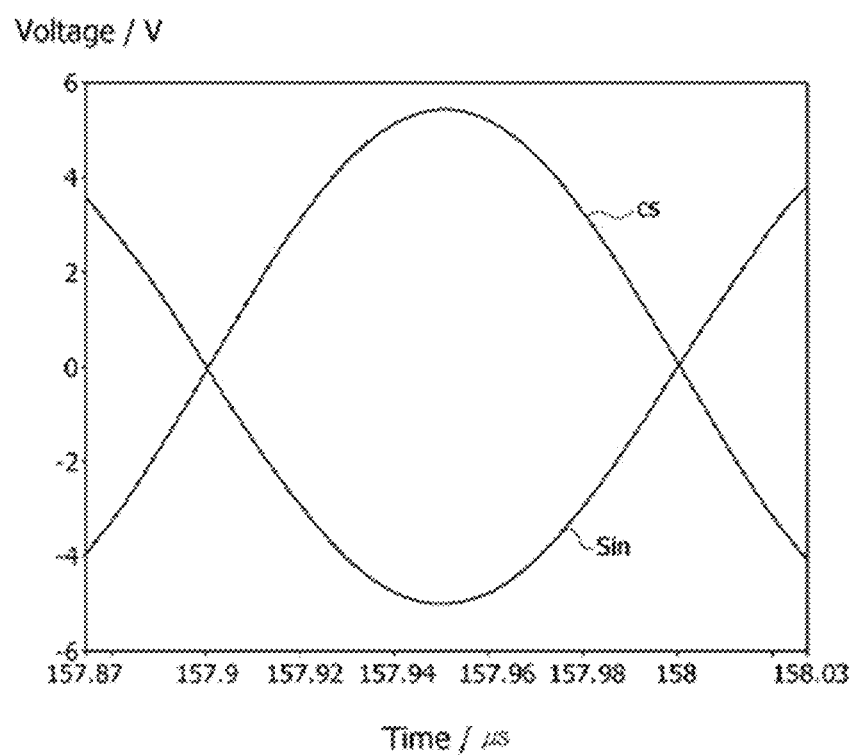
FIG. 10 is a waveform diagram showing the cancellation signal and the panel signal observed in an experiment according to example embodiments of the present disclosure.

FIG. 6 is a waveform diagram illustrating an example in which panel signals are delayed at the display panel. FIG. 7 is a waveform diagram illustrating an example in which phases and voltages of a first inverted signal and panel signals are asymmetric when the first inverted signal is applied to the display panel. FIG. 8 is a waveform diagram illustrating an example in which phases and voltages of panel signals and a cancellation signal are symmetric. FIG. 9 is a waveform diagram illustrating an example of a residual noise and an inverted residual noise. FIG. 10 is a waveform diagram showing the cancellation signal and the panel signal observed in an experiment.

When the panel signals Sin is applied to the display panel 100, the amplitude (voltage) thereof is reduced by the RC delay as shown in FIG. 6. It is due to the RC delay caused by the wire resistance of the display panel 100 and the channel capacity and resistance of the transistor 42. In FIG. 6, "Sout" denotes the panel signals Sin applied to the display panel 100 and delayed by the RC delay.

When the first inverted signal PS1 is applied to the display panel 100 as the cancellation signal, as shown in FIG. 7, since the amount of delay of the delayed panel signals Sout and the amount of delay of the cancellation signal are different from each other, there is a phase difference ΔP and a voltage difference ΔV between the delayed panel signals Sout and the cancellation signal. When the panel signals Sout and the cancellation signal are asymmetric, the cancellation efficiency of the electromagnetic wave is lowered. When there is a phase difference between the first inverted signal PS1 and the panel signals Sin, the cancellation efficiency may be further lowered.

Referring to FIGS. 8 and 9, the voltage and phase compensator 300 generates the cancellation signal CS by combining the first inverted signal PS1 obtained by adding and inverting the panel signals Sin1, Sin2, and Sin3, and the second inverted signal PS2 obtained by adding and inverting the feedback signals FB1, FB2, and FB3 input from the display panel 100 and the first inverted signal PS1. For example, the second inverted signal PS2 is obtained by adding and inverting the feedback signals FB1, FB2, and FB3 and the first inverted signal PS1 via the second inverted adder 320, and the cancellation signal CS is generated by combining the second inverted signal PS2 with the first inverted signal PS1 via the coupler 330, but the present disclosure is not limited thereto. When the feedback signals FB1, FB2, and FB3 and the first inverted signal PS1 are added, a residual noise Nres that is not cancellation is generated. The second inverted signal PS2 is an inverted signal /Nres of the residual noise Nres.

The cancellation signal CS output from the voltage and phase compensator 300 always has an inverted phase with respect to the panel signals Sin1, Sin2, and Sin3 applied to the display panel 100 regardless of whether the panel signals overlap or not and even if there is a phase difference between the panel signals and the first inverted signal PS1, and has the same amplitude as the amplitudes of the panel signals Sin1, Sin2, and Sin3. This may be seen in FIGS. 7 and 10. FIG. 10 shows the cancellation signal CS and the panel signals Sin observed in the experiment, as can be seen from FIG. 10, the cancellation signal CS output from the voltage and phase compensator 300 has an inverted phase with respect to the panel signals Sin applied to the display panel 100 and has the same amplitude as the amplitudes of the panel signals Sin.

Figure 11:
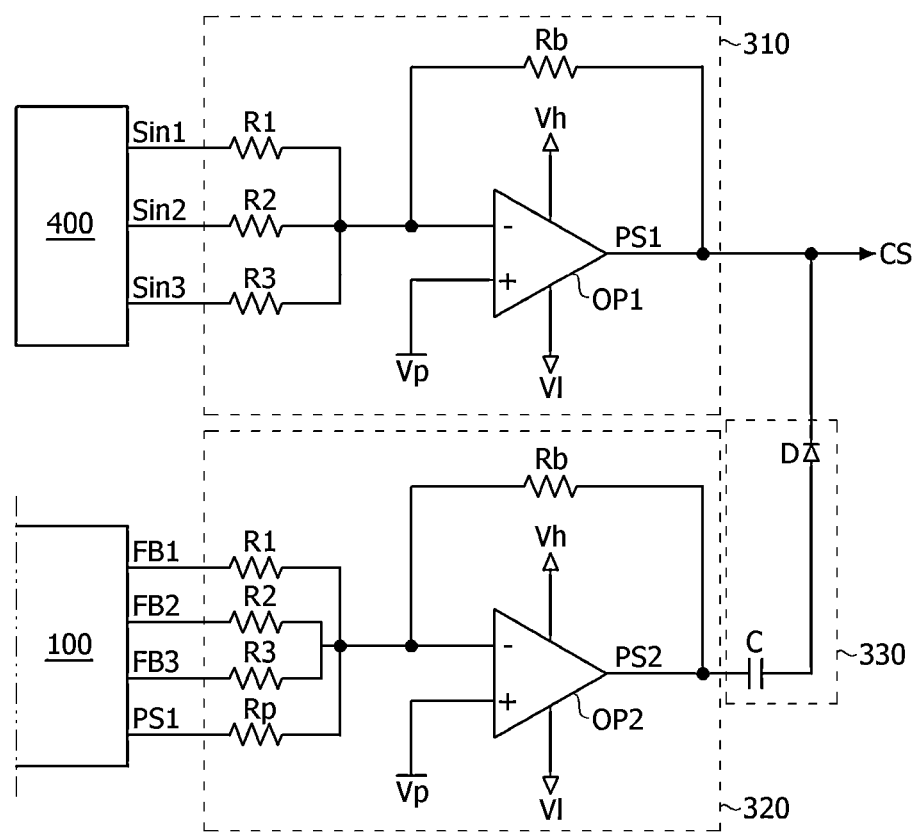
FIG. 11 is a circuit diagram illustrating in detail one example embodiment of a voltage and phase compensator according to example embodiments of the present disclosure.

FIG. 11 is a circuit diagram illustrating in detail one example embodiment of a voltage and phase compensator.

Referring to FIG. 11, the voltage and phase compensator 300 includes a first inverting adder 310 connected to the output terminals of the signal generator 400 and a second inverting adder 320 connected to the feedback signal wires 44 of the display panel 100. And the voltage and phase compensator 300 includes a coupler 330 connected to the output terminal of the first inverting adder 310, the output terminal of the second inverting adder 320, and the cancellation signal wire 40 of the display panel 100 to apply the cancellation signal CS obtained by combining the first inverted signal PS1 and the second inverted signal PS2 to the cancellation signal wire 40.

The first inverting adder 310 includes a first operational amplifier OP1, resistors R1, R2, and R3 connected to the inverting input terminal—of the first operational amplifier OP1, and a resistor Rb connected between the output terminal and the inverting input terminal—of the first operational amplifier OP1.

The driving voltage Vh is applied to the VDD terminal of the first operational amplifier OP1, and the low potential voltage Vl is applied to the VSS terminal. The reference voltage Vp is applied to the non-inverted input terminal of the first operational amplifier OP1.

The panel signals Sin1, Sin2, and Sin3 are input to the inverting input terminal—of the first operational amplifier OP1 through the resistors R1, R2, and R3. The first inverting adder 310 adds and inverts the panel signals Sin1, Sin2, and Sin3 to output the first inverted signal PS1 as shown in FIGS. 5A and 5B.

When the voltage of the first panel signals Sin1 is V1, the voltage of the second panel signals Sin2 is V2, and the voltage of the third panel signals Sin3 is V3, the output voltage Vo of the first inverting adder 310 is as shown in Equation 1 below:

$$Vo = -\left[\frac{R_b}{R_1}V1 + \frac{R_b}{R_2}V2 + \frac{R_b}{R_3}V3\right] = R_b\left[\frac{V1}{R_1} + \frac{V2}{R_2} + \frac{V3}{R_3}\right] \quad \text{Equation 1}$$

The second inverting adder 320 includes a second operational amplifier OP2, resistors R1, R2, R3, and Rp connected to the inverting input terminal—of the second operational amplifier OP2, and a resistor Rb connected between the output terminal and the inverting input terminal—of the second operational amplifier OP2.

The driving voltage Vh is applied to the VDD terminal of the second operational amplifier OP2, and the low potential voltage Vl is applied to the VSS terminal. The reference voltage Vp is applied to the non-inverted input terminal of the second operational amplifier OP2.

The feedback signals FB1, FB2, and FB3 of the panel signals received from the feedback signal wires 44 of the display panel 100 are input to the inverting input terminal—of the second operational amplifier OP2 through the resistors R1, R2, and R3. The first inverted signal PS1 output from the first inverting adder 310 is input to the inverting input terminal—of the second operational amplifier OP2 through the resistor Rp. The second inverting adder 320 outputs a second inverted signal PS2 generated as a result of adding and inverting the feedback signals FB1, FB2, and FB3 and the first inverted signal PS1.

The coupler 330 includes a capacitor C and a diode D connected in series between the output terminal of the first operational amplifier OP1 and the output terminal of the second operational amplifier OP2. The capacitor C is connected between the output terminal of the second operational amplifier OP2 and the diode D. The diode D includes an anode electrode connected to the capacitor C and a cathode electrode connected to the output terminal of the first operational amplifier OP1. The capacitor C allows only the AC component of the second inverted signal to pass toward the diode D, and the diode D blocks the reverse current flowing toward the second operational amplifier OP2.

In order to increase the cancellation efficiency, the voltages of the first inverted signal PS1 and the second inverted signal PS2 should be combined at the same ratio. To this end, the gain of the first and second operational amplifiers OP1 and OP2 should be matched so that their output voltage ratio is the same. For example, when the output voltage of the first operational amplifier OP1 is 1, the output voltage of the second operational amplifier OP2 may be 1, but not limited thereto. When the gains of the first operational amplifier OP1 and the second operational amplifier OP2 are different, the first inverted signal PS1 and the second inverted signal PS2 may be combined in a state that their phases and voltages are not exactly matched.

The gain of the operational amplifiers OP1 and OP2 may be determined by resistors R1, R2, R3, Rp, and Rb. For example, resistances may be R1=R2=R3=Rp=3kΩ and Rb=1kΩ, but are not limited thereto. Vh and Vl may be Vh=16V and Vl=−9V, but are not limited thereto. Vp may be a voltage between 3V and 7V, but is not limited thereto.

The voltage and phase compensation circuit illustrated in FIG. 11 may combine a first inverted signal PS1 and a second inverted signal PS2 that compensates for the voltage and phase of the first inverted signal PS1 into one within the driving voltage requirements of the operational amplifiers OP1 and OP2 and the display panel 100 by gain matching of the inverting adders 310 and 320 to output one cancellation signal CS.

Figure 12:
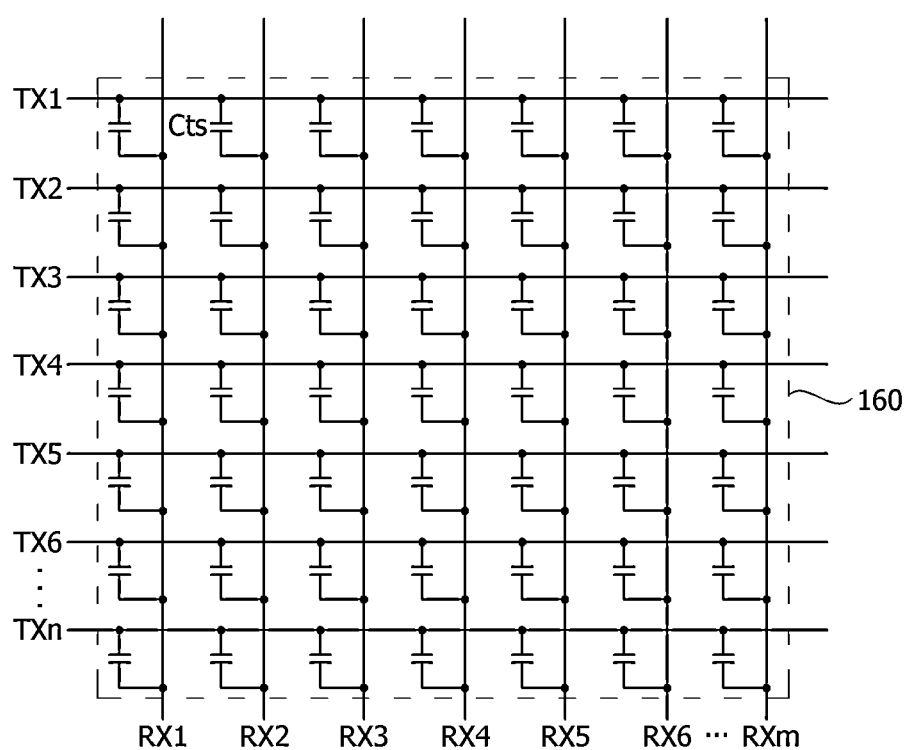
FIGS. 12 and 13 are diagrams illustrating one example of TX wires according to example embodiments of the present disclosure.
Figure 13:
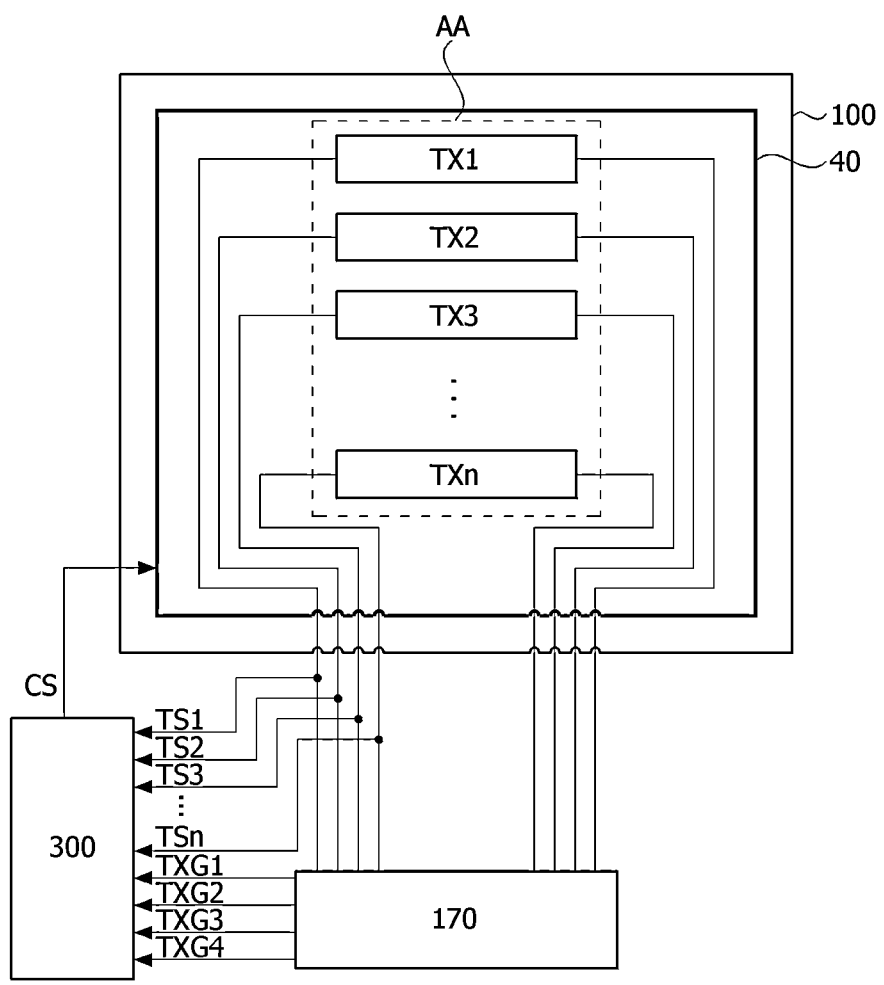
Figure 14:
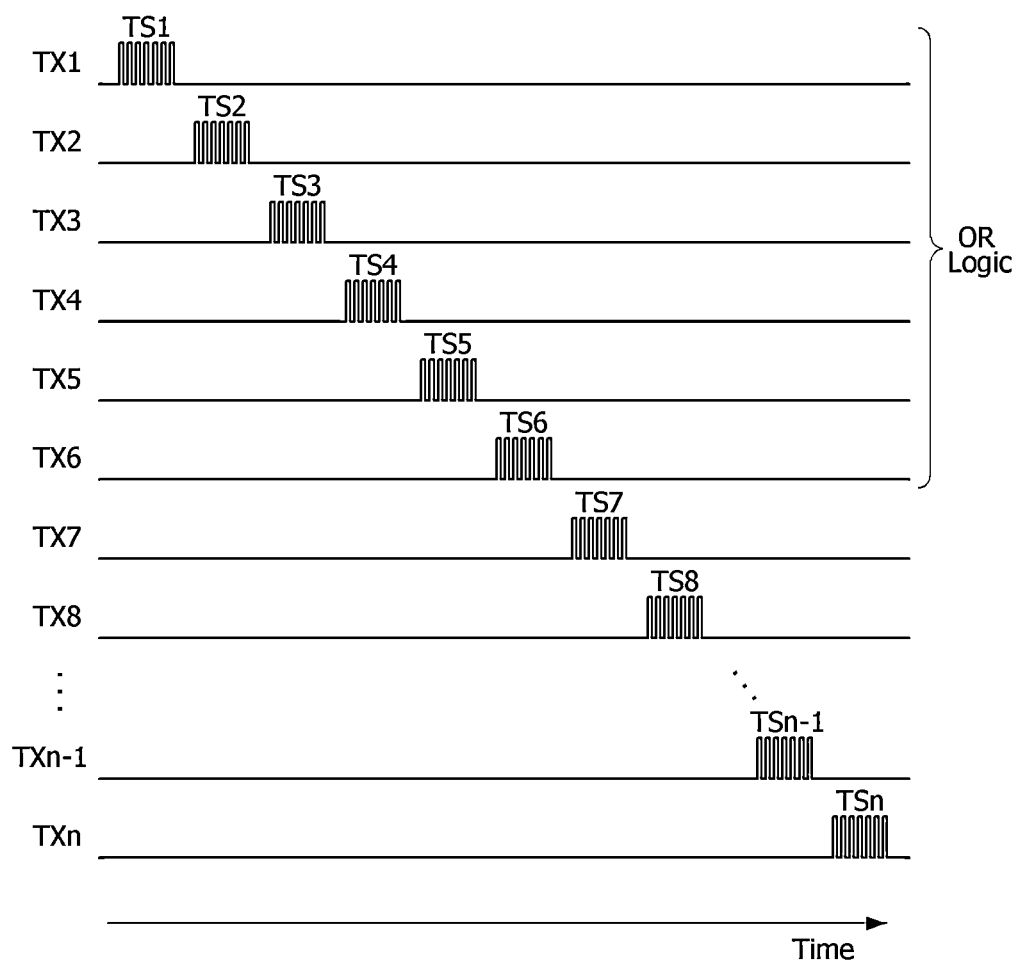
FIG. 14 is a waveform diagram illustrating an example of driving signals applied to the TX wires according to example embodiments of the present disclosure.

FIGS. 12 and 13 are diagrams illustrating examples of TX wires. FIG. 14 is a waveform diagram illustrating an example of driving signals applied to TX wires.

Referring to FIGS. 12 to 14, the touch screen includes a plurality of TX wires TX1 to TXn that supply a TX signal to the touch sensors, RX wires RX1 to RXm that intersect the TX wires TX1 to TXn, and a plurality of touch sensors Cts connected to the TX wires TX1 to TXn and the RX wires RX1 to RXm. The touch sensors Cts are charged depending on the driving voltage of the TX signal applied to the TX wires TX1 to TXn. Voltages of the touch sensors Cts may be received by the touch sensor driver 170 through the RX wires RX1 to RXm.

The touch sensor driver 170 sequentially applies TX signals including a plurality of pulses to the TX wires TX1 to TXn. For example, after the first TX signal is applied to the first TX wire TX1, the second TX signal is applied to the second TX wire TX2. After the (n−1)th TX signal is applied to the (n−1)th TX wire TXn-1, the nth TX signal is applied to the nth TX wire TXn, where n is an integer.

Since the TX wires TX1 to TXn have different lengths and different loop sizes, the emission amounts of electromagnetic waves may be different. As a result, it is difficult to generate an inverted signal that is accurately inverted by 180 degrees for each of the TX wires 191 to 19n because the deviation of the propagation delay of the TX signals applied to the TX wires TX1 to TXn is large.

The touch sensor driver 170 or the voltage and phase compensator 300 groups the TX signals applied to the TX wires TX1 to TXn and generates a plurality of TX group signals. The voltage and phase compensator 300 adds and inverts the TX group signals and appropriately adjusts the gain of the inverting adder for each group to output a cancellation signal CS in which the phase and voltage of the TX signal applied to the TX wires match. There may be a difference in TX voltages applied to the TX wires due to a difference in propagation delay of the TX signals applied to the TX wires. In order to increase electromagnetic wave cancellation efficiency of the TX signals applied to the TX wires, the gain of the inverting adder may be adjusted for each group so that the voltage of the cancellation signal CS may vary discretely, linearly, and continuously for each group. For example, for different TX group signals, different cancellation signals CSs are applied, but not limited thereto.

Figure 15:
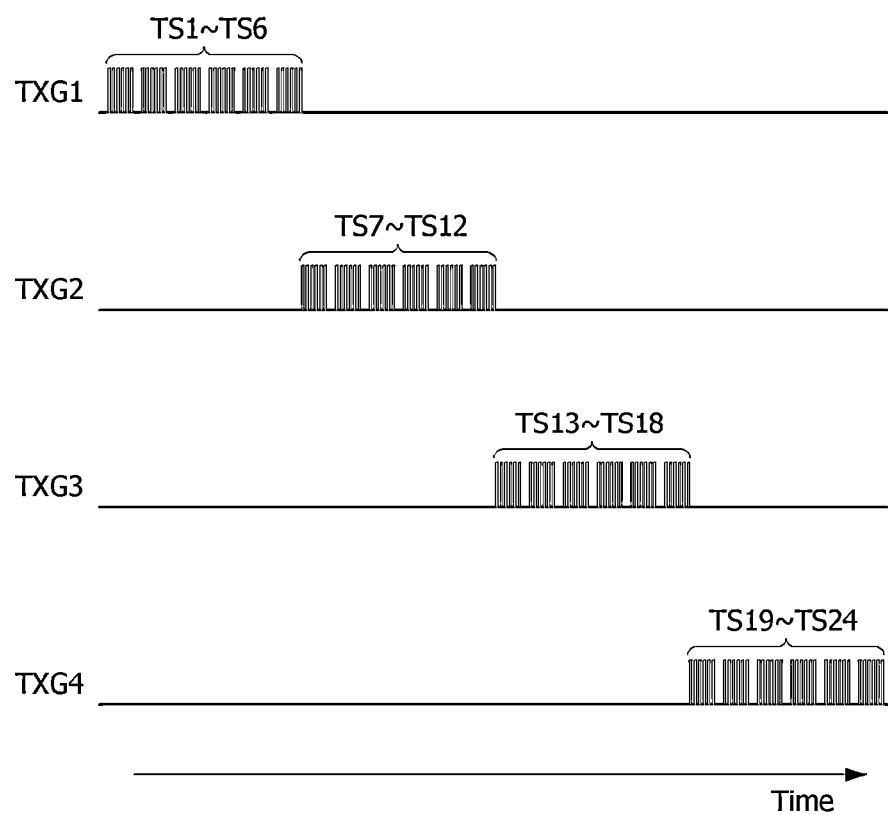
FIG. 15 is a waveform diagram illustrating an example of a method of grouping driving signals illustrated in FIG. 14 according to example embodiments of the present disclosure.

FIG. 15 is a waveform diagram illustrating an example of a method of grouping driving signals illustrated in FIG. 14.

Referring to FIGS. 14 and 15, the TX signals TS1 to TSn sequentially applied to the TX wires TX1 to TXn may be grouped into I TX wire units (where I is a natural number greater than or equal to two). Each of the TX signals TS1 to TSn may include a plurality of pulses.

The touch sensor driver 170 or the voltage and phase compensator 300 may group the I TX signals TS1 to TSn that are sequentially applied to the I TX wires TX1 to TXn using OR Logic to output one TX group signal.

In an example where the number of TX wires TX1 to TXn is 24 and I=6, TX signals that are sequentially applied to the six TX wires may be grouped into one TX group signal. The touch sensor driver 170 sequentially outputs the first to sixth TX signals TS1 to TS6, and the first to sixth TX signals TS1 to TS6 are combined to output the first TX group signal TXG1. Subsequently, the touch sensor driver 170 sequentially outputs the seventh to twelfth TX signals TS7 to TS12, and combines the seventh to twelfth TX signals TS7 to TS12 to output the second TX group signal TXG2. Subsequently, the touch sensor driver 170 sequentially outputs the thirteenth to eighteenth TX signals TS13 to TS18, and combines the thirteenth to eighteenth TX signals TS13 to TS18 to output the third TX group signal TXG3. Subsequently, the touch sensor driver 170 sequentially outputs the nineteenth to twenty-fourth TX signals TS19 to TS24, and combines the nineteenth to twenty-fourth TX signals TS19 to TS24 to output the fourth TX group signal TXG4. However, embodiments of the present disclosure are not limited thereto. In an example where the number of TX wires TX1 to TXn is 24 and I=8, TX signals that are sequentially applied to the eight TX wires may be grouped into one TX group signal. The touch sensor driver 170 sequentially outputs the first to eighth TX signals TS1 to TS8, and the first to eighth TX signals TS1 to TS8 are combined to output the first TX group signal TXG1. Subsequently, the touch sensor driver 170 sequentially outputs the ninth to sixteenth TX signals TS9 to TS16, and combines the ninth to sixteenth TX signals TS9 to TS16 to output the second TX group signal TXG2. Subsequently, the touch sensor driver 170 sequentially outputs the seventeenth to twenty-fourth TX signals TS17 to TS24, and combines the seventeenth to twenty-fourth TX signals TS17 to TS24 to output the third TX group signal TXG3, but not limited thereto.

The voltage and phase compensator according to one example embodiment of the present disclosure may include an inverting adder circuit that adds and inverts driving signals from a touch sensor driver, and a coupler connected between the inverting adder circuit and the cancellation signal wire.

Figure 16:
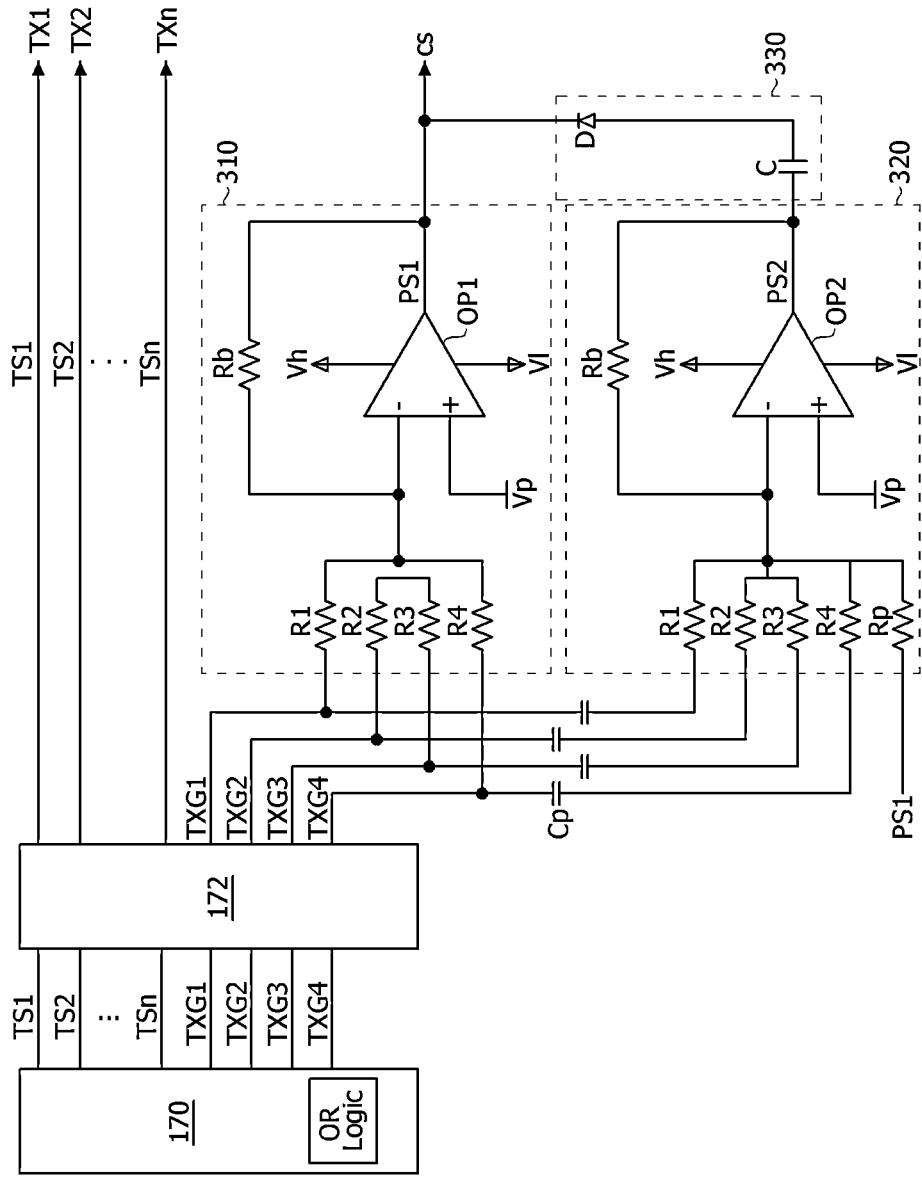
FIG. 16 is a circuit diagram illustrating in detail an example of a voltage and phase compensator to which a TX group signal illustrated in FIG. 15 is input according to example embodiments of the present disclosure.
Figure 17:
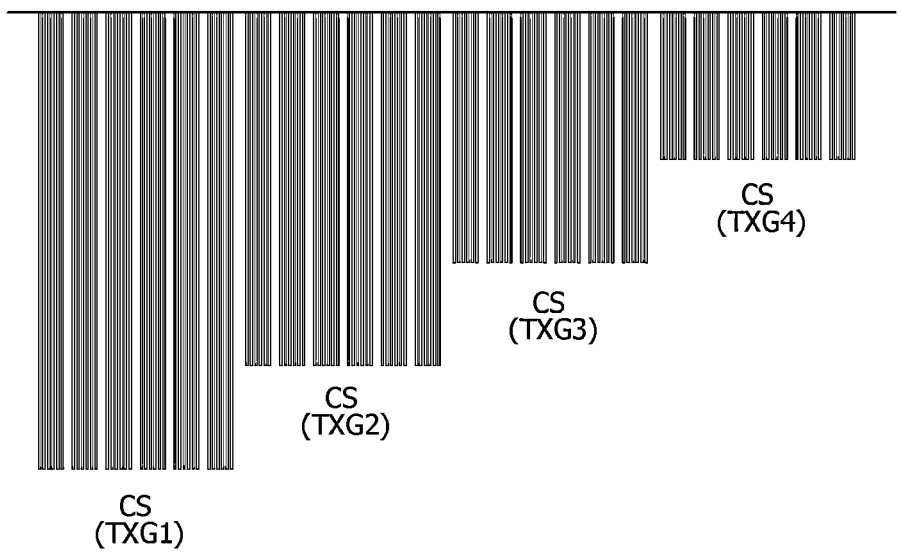
FIG. 17 is a waveform diagram illustrating an example of a cancellation signal having a voltage difference for each TX group according to example embodiments of the present disclosure.

FIG. 16 is a circuit diagram illustrating in detail an example of a voltage and phase compensator into which a TX group signal illustrated in FIG. 15 is input. In FIG. 16, components which are substantially identical to those of the example embodiment described above are designated by the same reference numerals, and detailed descriptions thereof are omitted. In the present example embodiment, TX wires of the touch screen having a multi-channel transmission structure may be grouped to individually control voltages for each TX group having a large asymmetry in electromagnetic wave emission amount so as to increase a cancellation effect, and to freely control an electromagnetic wave emission amount within the voltage used by the display device. FIG. 17 is a waveform diagram illustrating an example of a cancellation signal having a voltage difference for each TX group.

Referring to FIG. 16, the touch sensor driver 170 outputs TX signals TS1 to TSn that are sequentially shifted and TX group signals TXG1 to TXG4 in which the TX signals TS1 to TSn are grouped.

The level shifter 172 may be connected to output terminals of the touch sensor driver 170. Voltages of the output signals TS1 to TSn and TXG1 to TXG4 output from the touch sensor driver 170 may be converted into larger voltages by the level shifter 172.

The touch sensor driver 170 provides the first TX group signal TXG1 to the voltage and phase compensator 300 while the first to sixth TX signals TS1 to TS6 are sequentially applied to the first to sixth TX wires TX1 to TX6 of the display panel 100 through the level shifter 172. Subsequently, the touch sensor driver 170 provides the second TX group signal TXG2 to the voltage and phase compensator 300 while the seventh to twelfth TX signals TS7 to TS12 are sequentially applied to the seventh to twelfth TX wires TX7 to TX12 of the display panel 100 through the level shifter 172. Subsequently, the touch sensor driver 170 provides the third TX group signal TXG3 to the voltage and phase compensator 300 while the thirteenth to eighteenth TX signals TS13 to TS18 are sequentially applied to the thirteenth to eighteenth TX wires TX13 to TX18 of the display panel 100 through the level shifter 172. Subsequently, the touch sensor driver 170 provides the fourth TX group signal TXG4 to the voltage and phase compensator 300 while the nineteenth to twenty-fourth TX signals TS19 to TS24 are sequentially applied to the nineteenth to twenty-fourth TX wires TX19 to TX24 of the display panel 100 through the level shifter 172. However, the embodiments of the present disclosure are not limited thereto.

In an example where the number of TX wires TX1 to TXn is 24 and I=8, the touch sensor driver 170 provides the first TX group signal TXG1 to the voltage and phase compensator 300 while the first to eighth TX signals TS1 to TS8 are sequentially applied to the first to eighth TX wires TX1 to TX8 of the display panel 100 through the level shifter 172. Subsequently, the touch sensor driver 170 provides the second TX group signal TXG2 to the voltage and phase compensator 300 while the ninth to sixteenth TX signals TS9 to TS16 are sequentially applied to the ninth to sixteenth TX wires TX9 to TX16 of the display panel 100 through the level shifter 172. Subsequently, the touch sensor driver 170 provides the third TX group signal TXG3 to the voltage and phase compensator 300 while the seventeenth to twenty-fourth TX signals TS17 to TS24 are sequentially applied to the seventeenth to twenty-fourth TX wires TX17 to TX24 of the display panel 100 through the level shifter 172.

The voltage and phase compensator 300 may be connected between the level shifter 172 and the display panel 100. The voltage and phase compensator 300 includes a first inverting adder 310, a second inverting adder 320, and a coupler 330.

The first inverting adder 310 includes a first operational amplifier OP1, input resistors R1 to R4 connected to the inverting input terminal—of the first operational amplifier OP1, and a feedback resistor Rb connected between the output terminal and the inverting input terminal—of the first operational amplifier OP1.

The TX group signals TXG1 to TXG2 grouped by a logical OR may be sequentially input to the inverting input terminals—of the first and second inverting adders OP1 and OP2. For example, after the first TX group signal TXG1 is input to the first and second inverting adders OP1 and OP2, the second TX group signal TXG2 may be input to the first and second inverting adders OP1 and OP2.

The TX group signals TXG1 to TXG4 are input to the inverting input terminal—of the first operational amplifier OP1 through the resistors R1 to R4. The first inverting adder 310 adds and inverts the TX group signals TXG1 to TXG4 to output the first inverted signal PS1. The first inverted signal PS1 may cancel most of the electromagnetic waves emitted from the TX wires TX1 to TXn.

The second inverting adder 320 includes a second operational amplifier OP2, input resistors R1 to R4 and Rp connected to the inverting input terminal—of the second operational amplifier OP2, and a feedback resistor Rb connected between the output terminal and the inverting input terminal—of the second operational amplifier OP2. Gains of the first and second operational amplifiers OP1 and OP2 may be matched so that the output voltage ratio is the same.

The TX group signals TXG1 to TXG4 and the first inverted signal PS1 are input to the inverting input terminal—of the second operational amplifier OP2 through the resistors R1, R2, R3, and R4. The second inverting adder 320 adds and inverts the TX group signals TXG1 to TXG4 and the first inverted signal PS1 to output a second inverted signal PS2. The second inverted signal PS2 may cancel residual noise that is not canceled by the first inverted signal PS1.

Capacitors Cp may be connected in series between the TX group signal output terminals of the level shifter 172 and the input resistors R1, R2, R3, and R4 of the second operational amplifier OP2. The capacitors Cp block noise or ripple input to the second operational amplifier OP2. A resistor may be connected together with the capacitors Cp or without a capacitor, the resistor may be connected between the TX group signal output terminals of the level shifter 172 and the input resistors R1, R2, R3, and R4 of the second operational amplifier OP2. The capacitor Cp and/or the resistor for suppressing noise may also be applied to other example embodiments.

The coupler 330 combines the first inverted signal PS1 and the second inverted signal PS2 to output a cancellation signal CS. The cancellation signal CS is applied to the cancellation signal wire 40 of the display panel 100 to cancel electromagnetic waves emitted from the TX wires without residual noise. The coupler 330 may include a capacitor C and a diode D connected in series between the output terminal of the first operational amplifier OP1 and the output terminal of the second operational amplifier OP2.

The voltage of the cancellation signal CS may be set differently for each TX group signal to match the voltage of the TX signals TS1 to TSn applied to the TX wires TX1 to TXn. The voltage of the cancellation signal CS may be different for each TX group by using resistance values for setting gains of the inverting adders 310 and 320. Resistance values of at least two of the input resistors R1, R2, R3, and R4 of the first operational amplifier OP1 may be different from each other, for example, resistance values of all of the input resistors R1, R2, R3, and R4 of the first operational amplifier OP1 may be different, but not limited thereto. Resistance values of at least two of the input resistors R1, R2, R3, R4 and Rp of the second operational amplifier OP2 may be different from each other, for example, resistance values of all of the input resistors R1, R2, R3, R4 and Rp of the second operational amplifier OP2 may be different, but not limited thereto.

When the resistance values of the resistors R1, R2, R3, and R4 to which the TX group signals TXG1 to TXG4 are applied are R1<R2<R3<R4, the voltage of the cancellation signal CS may be controlled as TXG1>TXG2>TXG3>TXG4 as shown in FIG. 17. The voltage and phase compensator 300 may appropriately adjust the gains of the inverting adders 310 and 320 for each TX group, and output the voltage of the cancellation signal CS as a voltage having the difference of discrete, linear, and continuous voltage levels for each TX group. For example, the voltage of the cancellation signal CS may be freely controlled by a voltage difference such as 0V, 0.1 V . . . 8.5V, 16.2V, 17V, 18V, etc. per TX group.

Figure 18:
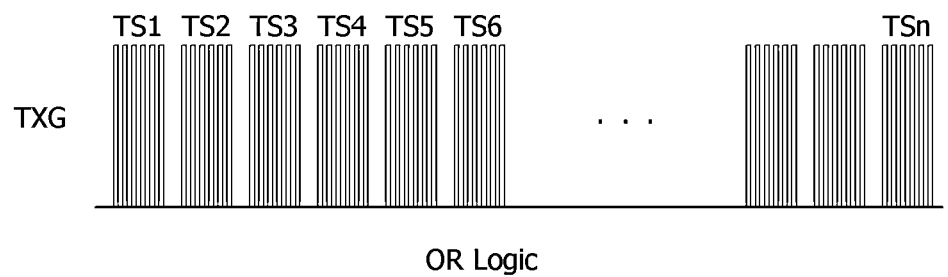
FIG. 18 is a waveform diagram illustrating another example of a method of grouping the driving signals illustrated in FIG. 14 according to example embodiments of the present disclosure.
Figure 18:
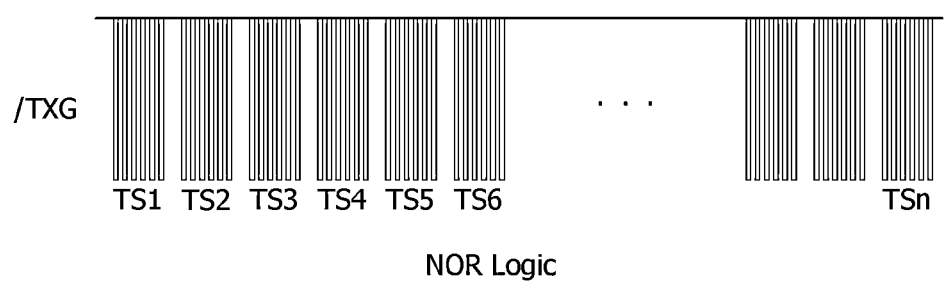

Meanwhile, the voltage and phase compensator 300 may group the TX signals TS1 to TSn output from the touch sensor driver 170 or the level shifter 172 by using the same method as in FIG. 15 or 18. In this case, it is not necessary for the touch sensor driver 170 to generate the TX group signal.

Figure 19:
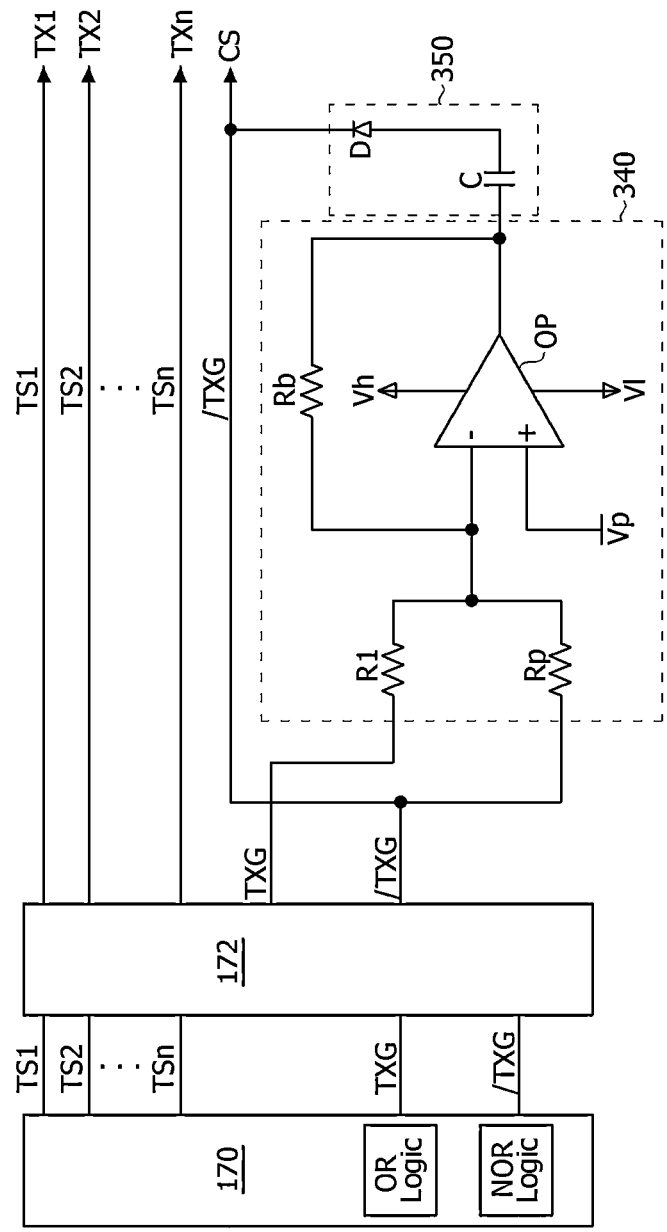
FIG. 19 is a circuit diagram illustrating in detail an example of a voltage and phase compensator into which single group signals and inverted group signals as shown in FIG. 18 are inputted according to example embodiments of the present disclosure.

FIGS. 18 and 19 show one example embodiment in which the voltage and phase compensator 300 outputs a cancellation signal only with a single inverting adder. The example embodiment may provide a sufficient cancellation effect by a method of compensating for the phase of the inverted signal.

FIG. 18 is a waveform diagram illustrating another example of a method of grouping driving signals illustrated in FIG. 14.

Referring to FIG. 18, the touch sensor driver 170 or the voltage and phase compensator 300 groups the TX signals TS1 to TSn applied to all the TX wires TX1 to TXn into one signal using OR Logic and outputs a single group signal TXG. Also, the touch sensor driver 170 or the voltage and phase compensator 300 outputs an inverted group signal /TXG using a NOR Logic. The phase of the single group signal TXG and the inverted group signal /TXG are inverted in phase with each other.

FIG. 19 is a circuit diagram illustrating in detail an example of a voltage and phase compensator to which a single group signal and an inverted group signal are inputted as shown in FIG. 18.

Referring to FIG. 19, the touch sensor driver 170 outputs the TX signals TS1 to TSn, the single group signal TXG, and the inverted group signal /TXG, which are sequentially shifted. The voltages of the output signals TS1 to TSn, TXG, and /TXG output from the touch sensor driver 170 may be converted into larger voltages through the level shifter 172.

The voltage and phase compensator 300 includes an inverting adder 340 and a coupler 350.

The inverting adder 340 includes an operational amplifier OP, resistors R1 and Rp connected to the inverting input terminal—of the operational amplifier OP, and a resistor Rb connected between the output terminal and the inverting input terminal—of the operational amplifier OP.

The single group signal TXG and the inverted group signal /TXG are input to the inverting input terminal—of the operational amplifier OP through resistors R1 and Rp. The inverting adder 340 adds and inverts the single group signal TXG and the inverted group signal /TXG, and outputs the same.

When the voltage of the group signal TXG is V1 and the voltage of the inverted group signal /TXG is V2, the output voltage Vo of the inverting adder 340 is as shown in Equation 2 below:

$$Vo = -\left[\frac{R_b}{R_1}V1 + \frac{R_b}{R_p}V2\right] = R_b\left[\frac{V1}{R_1} + \frac{V2}{R_p}\right] \quad \text{Equation 2}$$

The coupler 350 combines the output signal of the inverting adder 340 and the inverted group signal /TXG to output the cancellation signal CS. The cancellation signal CS is applied to the cancellation signal wire 40 of the display panel 100. The cancellation signal CS is inverted in phase by 180 degrees with respect to the TX signals TS1 to TSn applied to the TX wires TX1 to TXn to cancel electromagnetic waves emitted from the TX wires TX1 to TXn. The coupler 350 may include a capacitor C and a diode D connected in series between the output terminal of the operational amplifier OP and a node to which the inverted group signal /TXG is applied.

Figure 20:
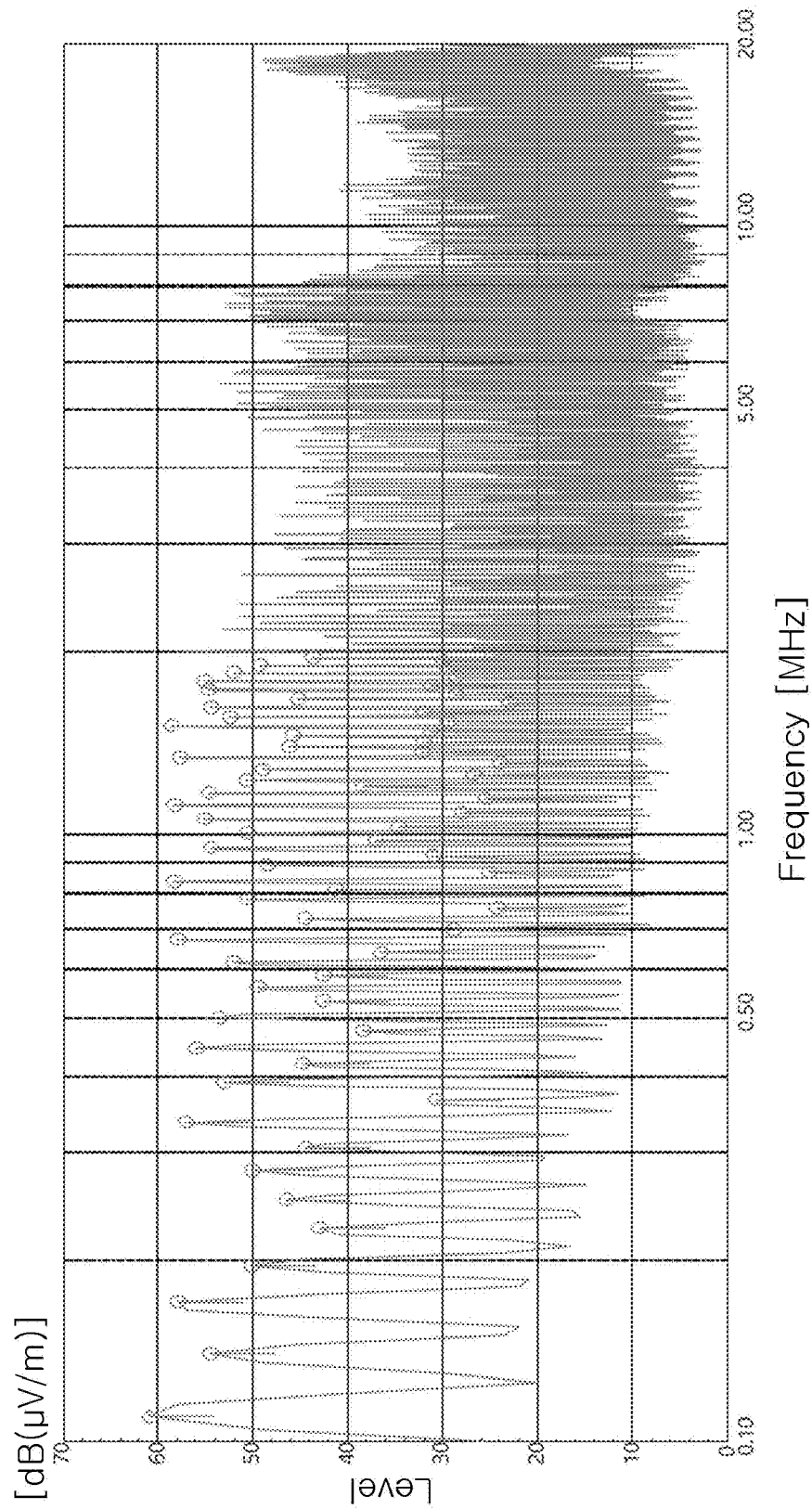
FIG. 20 is an experimental result diagram showing an EMI improvement effect of a comparative example having a phase difference between the panel signals and the first inverted signal according to example embodiments of the present disclosure.
Figure 21:
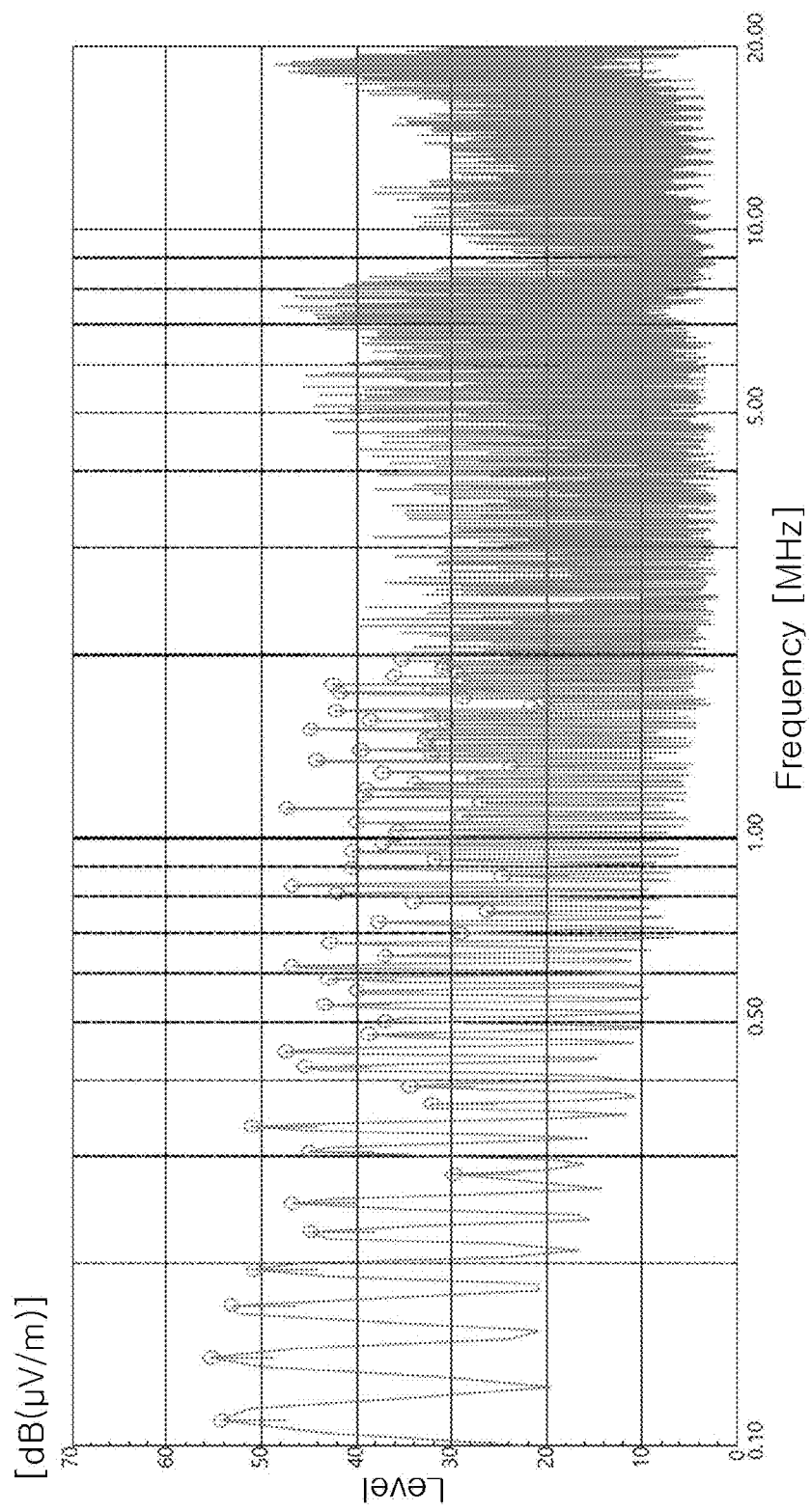
FIG. 21 is an experimental result diagram showing an EMI improvement effect of a voltage and phase compensation circuit according to example embodiments of the present disclosure.

FIGS. 20 and 21 show experimental results comparing the voltage and phase compensators according to a comparative example and an example embodiment of the present disclosure in order to verify an EMI improvement effect of the present disclosure. FIG. 20 is a diagram of experimental results showing an EMI improvement effect of a comparative example having a phase difference between panel signals and a first inverted signal. FIG. 21 is a diagram of experimental results showing the EMI improvement effect of voltage and phase compensation circuits according to example embodiments of the present disclosure.

A comparative example is a sample having a phase difference of 100 ns between panel signals and a first inverted signal when the first inverted signal is applied to the cancellation signal wire of the display panel without the second inversion addition. In the comparative example, the maximum EMI was measured to be approximately 60 [dB µV] in FIG. 20. In comparison, the maximum EMI measured in the present disclosure was measured to be approximately 50 [dB µV] in FIG. 21. Accordingly, the present disclosure provides an EMI improvement effect that is reduced by approximately 10 [dB] when compared to the comparative example.

According to one or more example embodiments of the present disclosure, the display device may be applied to mobile devices, video phones, smart watches, watch phones, wearable devices, foldable devices, rollable devices, bendable devices, flexible devices, curved devices, sliding devices, variable devices, electronic organizers, electronic books, portable multimedia players (PMPs), personal digital assistants (PDAs), MP3 players, mobile medical devices, desktop PCs, laptop PCs, netbook computers, workstations, navigations, vehicle navigations, vehicle display devices, vehicle devices, theater devices, theater display devices, televisions, wallpaper devices, signage devices, game devices, laptops, monitors, cameras, camcorders, and home appliances, etc. Additionally, the display apparatus according to one or more example embodiments of the present disclosure may be applied to organic light emitting lighting devices or inorganic light emitting lighting devices.

The objects to be achieved by the present disclosure, the means for achieving the objects, and effects of the present disclosure described above do not specify essential features of the claims, and thus, the scope of the claims is not limited to the disclosure of the present disclosure.

Although the example embodiments of the present disclosure have been described in more detail with reference to the accompanying drawings, the present disclosure is not limited thereto and may be embodied in many different forms without departing from the technical concept of the present disclosure. Therefore, the example embodiments disclosed in the present disclosure are provided for illustrative purposes only and are not intended to limit the technical concept of the present disclosure. The scope of the technical concept of the present disclosure is not limited thereto. Therefore, it should be understood that the above-described example embodiments are illustrative in all aspects and do not limit the present disclosure.

What is claimed is:

1. A voltage and phase compensation circuit comprising:
 a first inverting adder configured to add and invert a plurality of panel signals to output a first inverted signal;
 a second inverting adder configured to add and invert feedback signals obtained from delayed panel signals and the first inverted signal to output a second inverted signal; and
 a coupler configured to combine the first inverted signal and the second inverted signal.

2. The voltage and phase compensation circuit of claim 1, wherein a signal that combines the first inverted signal and the second inverted signal has an inverted phase of the delayed panel signals and has a voltage equal to the voltage of the delayed panel signals.

3. The voltage and phase compensation circuit of claim 1, wherein the first inverting adder includes:
 a first operational amplifier including:
  a first inverting input terminal connected to a plurality of first input resistors to which the plurality of panel signals are applied,
  a first non-inverting input terminal to which a reference voltage is applied, and
  a first output terminal connected to the first inverting input terminal with a first resistor interposed therebetween, the first output terminal outputting the first inverted signal, and
 wherein the second inverting adder includes:
  a second operational amplifier including:
   a second inverting input terminal connected to a plurality of second input resistors to which the feedback signals and the first inverted signal are applied,
   a second non-inverting input terminal to which the reference voltage is applied, and
   a second output terminal connected to the second inverting input terminal with a second resistor interposed therebetween, the second output terminal outputting the second inverted signal.

4. The voltage and phase compensation circuit of claim 3, wherein the plurality of panel signals include:
a first panel signal, a second panel signal, and a third panel signal having different phases,
wherein the feedback signals include:
a first feedback signal obtained from delay of the first panel signal,
a second feedback signal obtained from delay of the second panel signal, and
a third feedback signal obtained from delay of the third panel signal,
wherein the first panel signal, the second panel signal, and the third panel signal are input to the first inverting input terminal of the first operational amplifier through the plurality of first input resistors of the first operational amplifier, and
wherein the first feedback signal, the second feedback signal, the third feedback signal, and the first inverted signal are input to the second inverting input terminal of the second inverting adder through the plurality of second input resistors of the second operational amplifier.

5. The voltage and phase compensation circuit of claim 3, wherein an output voltage ratio of the first operational amplifier and an output voltage ratio of the second operational amplifier are same.

6. The voltage and phase compensation circuit of claim 3, wherein the coupler includes:
a capacitor and a diode connected in series between the first output terminal of the first operational amplifier and the second output terminal of the second operational amplifier.

7. A display device comprising:
a display panel on which wires to which a plurality of panel signals are applied, feedback wires each connected to the wires, a plurality of pixels, and cancellation signal wires are on the display panel;
a display panel driving circuit configured to write pixel data of an input image into the plurality of pixels;
a signal generator configured to output the plurality of panel signals; and
a voltage and phase compensator configured to supply a cancellation signal to the cancellation signal wires,
wherein the voltage and phase compensator includes:
a first inverting adder configured to add and invert the plurality of panel signals to output a first inverted signal;
a second inverting adder configured to add and invert feedback signals received from the feedback wires and the first inverted signal to output a second inverted signal; and
a coupler configured to combine the first inverted signal and the second inverted signal to output the cancellation signal.

8. The display device of claim 7, wherein the display panel further includes:
a plurality of data lines to which a data voltage is applied; and
a plurality of gate lines to which a gate signal is applied,
wherein the display panel driving circuit further includes:
a data driver configured to output the data voltage;
a demultiplexer connected between the plurality of data lines and output terminals of the data driver; and
a gate driver configured to output the gate signal, and
wherein the plurality of panel signals include at least one of a control signal configured to control transistors of the demultiplexer or a clock input to the gate driver.

9. The display device of claim 8, wherein the display panel further includes TX wires connected to a plurality of touch sensors,
wherein the display panel driving circuit further includes a touch sensor driver configured to supply driving signals to the TX wires, and
wherein the plurality of panel signals include the driving signals.

10. A display device comprising:
a display panel, wherein TX wires connected to a plurality of touch sensors, a plurality of pixels, and cancellation signal wires are on the display panel;
a touch sensor driver configured to sequentially supply driving signals to the TX wires; and
a voltage and phase compensator configured to supply cancellation signals to the cancellation signal wires,
wherein the voltage and phase compensator includes:
an inverting adder circuit configured to add and invert driving signals from the touch sensor driver; and
a coupler connected between the inverting adder circuit and the cancellation signal wires.

11. The display device of claim 10, wherein the inverting adder circuit includes:
a first inverting adder configured to add and invert two or more group signals, wherein a plurality of the driving signals are grouped to output a first inverted signal; and
a second inverting adder configured to add and invert the two or more group signals and the first inverted signal to output a second inverted signal.

12. The display device of claim 11, wherein the coupler is configured to combine the first inverted signal and the second inverted signal to output one of the cancellation signals.

13. The display device of claim 11, wherein:
each of the two or more group signals includes two or more of the driving signals grouped by logical OR,
the two or more group signals are sequentially input to each of the first inverting adder and the second inverting adder, and
each of the driving signals includes a plurality of pulses.

14. The display device of claim 11, wherein the first inverting adder includes:
a first operational amplifier including:
a first inverting input terminal electrically connected to a plurality of first input resistors to which the two or more group signals are applied,
a first non-inverting input terminal to which a reference voltage is applied, and
a first output terminal electrically connected to the first inverting input terminal to output the first inverted signal with a first resistor interposed therebetween, and
wherein the second inverting adder includes:
a second operational amplifier including:
a second inverting input terminal connected to a plurality of second input resistors to which the two or more group signals and the first inverted signal are applied,
a second non-inverting input terminal to which the reference voltage is applied, and a second output terminal connected to the second inverting input terminal to output the second inverted signal with a second resistor interposed therebetween.

15. The display device of claim 14, wherein an output voltage ratio of the first operational amplifier and an output voltage ratio of the second operational amplifier are same.

16. The display device of claim 15, wherein:
resistance values of at least two of the plurality of first input resistors of the first operational amplifier are different from each other, and
resistance values of at least two of the plurality of second input resistors of the second operational amplifier are different from each other.

17. The display device of claim 14, wherein the coupler includes:
a capacitor and a diode connected in series between the first output terminal of the first operational amplifier and the second output terminal of the second operational amplifier.

18. The display device of claim 10, wherein the inverting adder circuit includes:

an inverting adder configured to add and invert a group signal in which the driving signals applied to the TX wires are grouped and an inverted signal in which the group signal is inverted; and
a coupler configured to combine an output signal of the inverting adder and the inverted signal to output one of the cancellation signals.

19. The display device of claim 18, wherein the inverting adder circuit includes:
an operational amplifier including an inverting input terminal connected to a plurality of input resistors to which the group signal and the inverted signal are applied, a non-inverting input terminal to which a reference voltage is applied, and an output terminal connected to the inverting input terminal with a resistor interposed therebetween.

20. The display device of claim 19, wherein the coupler includes:
a capacitor and a diode connected in series between the output terminal of the operational amplifier and a node to which the inverted signal is applied.

* * * * *